United States Patent
Nada

(10) Patent No.: US 6,563,230 B2
(45) Date of Patent: May 13, 2003

(54) HYBRID VEHICLE AND METHOD OF CONTROLLING HYBRID VEHICLE

(75) Inventor: Mitsuhiro Nada, Toyota (JP)

(73) Assignee: Toyota Jidosha Kabushiki Kaisha, Toyota (JP)

( * ) Notice: Subject to any disclaimer, the term of this patent is extended or adjusted under 35 U.S.C. 154(b) by 0 days.

(21) Appl. No.: 09/858,466

(22) Filed: May 17, 2001

(65) Prior Publication Data

US 2001/0048226 A1 Dec. 6, 2001

(30) Foreign Application Priority Data

May 24, 2000 (JP) ........................................ 2000-152521

(51) Int. Cl.[7] ............................................... B60K 1/00
(52) U.S. Cl. .................................... 290/40 C; 180/65.2
(58) Field of Search ............................ 290/40 A, 40 C, 290/40 R, 40 B; 180/65.2, 65.6

(56) References Cited

U.S. PATENT DOCUMENTS

| | | | |
|---|---|---|---|
| 3,566,717 A | 3/1971 | Berman et al. | ................ 74/859 |
| 3,732,751 A | 5/1973 | Berman et al. | ................ 74/675 |
| 5,588,498 A | 12/1996 | Kitada | ........................ 180/65.4 |
| 5,823,280 A | 10/1998 | Lateur et al. | ............... 180/65.2 |
| 5,823,281 A | 10/1998 | Yamaguchi et al. | ........ 180/65.2 |
| 5,915,489 A * | 6/1999 | Yamaguchi | ................. 180/65.2 |
| 6,278,195 B1 * | 8/2001 | Yamaguchi et al. | ...... 290/40 A |
| 6,340,847 B1 * | 1/2002 | Kawabata et al. | ............ 290/17 |
| 6,389,807 B1 * | 5/2002 | Suzuki et al. | ............... 180/65.3 |
| 6,397,963 B1 * | 6/2002 | Lennevi | ...................... 180/65.2 |
| 2001/0048226 A1 * | 12/2001 | Nada | ......................... 290/40 C |
| 2002/0129980 A1 * | 2/2002 | Mizon et al. | ............... 180/65.6 |

FOREIGN PATENT DOCUMENTS

| | | |
|---|---|---|
| DE | 198 49 312 A1 | 5/1999 |
| EP | 0 965 474 A2 | 12/1999 |
| FR | 2 783 763 | 3/2000 |
| JP | 50-18136 | 6/1975 |
| JP | 08-322108 | 12/1996 |
| JP | 11 18213 | 1/1999 |

* cited by examiner

*Primary Examiner*—Nicholas Ponomarenko
(74) *Attorney, Agent, or Firm*—Oliff & Berridge, PLC

(57) ABSTRACT

In a hybrid vehicle of the present invention, an engine EG is subjected to feedback control to attain a target revolving speed NE*. In the case of malfunction of an inverter P1 for a generator GN, operation of the inverter P1 is stopped. When the generator GN is driven to rotate at a predetermined rotational speed, a counter electromotive force arises in a multiphase phase coil of the generator GN. When a motor MG is connected to the generator GN as a loading, electric current runs via a protection diode of the inverter P1 to implement power generation by the generator GN. The electric power generated by the generator GN is directly consumed by the motor MG. This arrangement enables the quantity of power generation to balance the quantity of consumption. Here the revolving speed of the engine EG is varied according to the loading applied to the vehicle. The arrangement of the present invention thus enables the amount of electric power generated by one of the generator GN and the motor MG to balance the amount of electric power consumed by the other of the generator GN and the motor MG, thus attaining a drive of the hybrid vehicle without using a secondary battery.

9 Claims, 19 Drawing Sheets

Detect welding failure of SMR1 or SMR1

Detect welding failure of SMR3

HYBRID VEHICLE AND METHOD OF CONTROLLING HYBRID VEHICLE

BACKGROUND OF THE INVENTION

1. Field of the Invention

The present invention relates to a hybrid vehicle and a method of controlling the hybrid vehicle. More specifically the invention pertains to a hybrid vehicle with an engine that outputs power through combustion of a fuel, a generator that generates electric power with at least part of the power output from the engine, and a motor that outputs power to a drive shaft of the vehicle, as well as a method of controlling such a hybrid vehicle.

2. Description of the Related Art

A diversity of hybrid vehicles have been proposed. The hybrid vehicle has a motor that outputs electric power as a driving force, in addition to an engine that outputs power through combustion of a fuel, such as gasoline. The hybrid vehicle uses the engine as the final energy source and thus requires only the supply of gasoline or another fuel. It is accordingly not required to socially provide new facilities and equipment, for example, power stations for charging batteries.

The hybrid vehicles are mainly classified into series hybrid vehicles and parallel hybrid vehicles. The series hybrid vehicle uses all the power output from the engine to drive a generator, accumulates the electric power generated by the generator in a battery, and obtains the required driving force to be output to the drive shaft from a motor, which is driven with the electric power accumulated in the battery. The parallel hybrid vehicle has a three shaft-type power distributing mechanism or a pair-rotor motor to distribute the power of the engine, for example, a gasoline engine, and causes the power output from the engine to supply part of the driving force to be output to the drive shaft. In the parallel hybrid vehicle, the residual power that is not output to the drive shaft is used for power generation by the generator. The generated electric power is generally accumulated in a battery or a high-capacity capacitor.

The electric power accumulated in the secondary battery or the high-capacity capacitor is used to drive the vehicle while the engine is at a stop. When the engine is driven but the driving force of the engine does not satisfy all the required torque, the motor utilizes the accumulated electric power to supplement the insufficient torque.

In the hybrid vehicle of the above structure, in the case of malfunction of the secondary battery or the high-capacity capacitor that accumulates the electric power therein or in the case of malfunction of a charging circuit for charging the secondary battery or the high-capacity capacitor, operation of the generator is not allowed. This makes a further drive of the vehicle difficult. According to the principles of the hybrid vehicle, the vehicle can be driven by directly connecting the generator with the motor and driving the motor with the generated electric power. The drive mode in this state is called the battery-less drive mode. In the case where the vehicle is actually driven in the direct connection of the generator with the motor, however, expected abrupt variations in loading on the motor during a drive cause a diversity of problems and troubles. There is a possibility that the loading or the required power of the drive shaft during a drive abruptly decreases within a very short time, due to racing of wheels or any braking operation. In such cases, the electric current to be flown into the motor also abruptly decreases within a very short time. The abrupt decrease in required electric current causes a high impedance in the generator that is driven in stationary state by the engine. This abruptly raises the voltage between terminals of the generator and causes an unexpectedly high voltage to be applied to the circuit and exceed the rated power of the circuit.

In the actual state, these problems make the battery-less drive mode substantially unpractical. It is difficult to actualize the limp home capability that enables the vehicle to be anyway driven to a gas station while the battery or its charging circuit malfunctions. Especially in the case of malfunction of a switching element included in an inverter that is connected to the generator to form the charging circuit, even when the engine, the generator, and the motor are all normally operable, the vehicle is driven only with the electric power accumulated in the battery. This undesirably leads to a restricted driving distance or a limited vehicle speed.

The secondary battery used in the hybrid vehicle is a high voltage battery. Positive and negative power lines respectively have contacts to cut off the connection of the power lines with the secondary battery in the inactive state. These contacts are kept open when the vehicle is not used or when some abnormality is detected in the battery. The open position of the contacts prevents the high voltage of the secondary battery from being applied to the power lines when not required. These contacts are used to allow and forbid a large flow of electric current and are thereby often subject to troubles like welding. The prior art arrangement accordingly connects the power line with a standard contact in parallel via a resistor for restricting the electric current and an auxiliary contact. The procedure first closes the auxiliary contact to allow a restricted flow of electric current and then closes the standard contact.

In this prior art arrangement, however, there is still a possibility that the contact welds. In response to detection of a weld of the contact in either one of the positive and negative power lines, the prior art arrangement prohibits the use of the secondary battery. If the continuous use of the secondary battery is allowed in the welding state of one contact, the connection of the secondary battery with the power lines can not be cut off in case of a weld of the other contact.

SUMMARY OF THE INVENTION

The object of the present invention is thus to attain a drive of a hybrid vehicle with an engine, a generator, and a motor mounted thereon without using a secondary battery.

At least part of the above and the other related objects is actualized by a first hybrid vehicle with an engine, a generator, and a motor mounted thereon, wherein the engine outputs power through combustion of a fuel, the generator provided with permanent magnets generates electric power with at least part of the power output from the engine, and the motor outputs power to a drive shaft of the hybrid vehicle. The first hybrid vehicle includes: an engine control unit that feedback controls a quantity of the fuel injected to the engine to attain a specified target revolving speed of the engine; a power generation control unit that causes the generator to carry out power generation utilizing a counter electromotive force; a loading detection unit that specifies a loading applied to the hybrid vehicle; a generator rotational speed variation unit that varies a rotational speed of the generator, based on the specified loading; and a motor driving unit that drives the motor with the electric power generated by the generator at the varying rotational speed.

There is also a method of controlling the hybrid vehicle, which corresponds to the arrangement of the first hybrid vehicle. The present invention is accordingly directed to a first method of controlling a hybrid vehicle, wherein an engine outputs power through combustion of a fuel, a generator provided with permanent magnets generate electric power with at least part of the power output from the engine, and a motor is driven with at least part of the electric power generated by the generator, so as to output power to a drive shaft of the vehicle. The first method includes the steps of: feedback controlling a quantity of the fuel injected to the engine to attain a specified target revolving speed of the engine; causing the generator to carry out power generation utilizing a counter electromotive force; specifying a loading applied to the hybrid vehicle; varying a rotational speed of the generator, based on the specified loading; and driving the motor with the electric power generated by the generator at the varying rotational speed.

The first hybrid vehicle of the present invention or the corresponding first method of controlling the hybrid vehicle feedback controls the quantity of the fuel injected to the engine, in order to make the actual revolving speed of the engine coincident with a specified target revolving speed. This arrangement effectively prevents the revolving speed of the engine from varying with a variation in loading of the generator, which generates electric power with at least part of the power output from the engine. While the generator carries out power generation utilizing a counter electromotive force, the motor consumes the electric power generated by the generator and carries out the power operation. The rotational speed of the generator is varied according to the loading applied to the vehicle. This arrangement enables the adequate power corresponding to the loading of the vehicle to be output to the drive shaft of the vehicle. The arrangement of varying the rotational speed of the generator with a variation in loading applied to the vehicle effectively prevents the rotational speed of the generator from being unnecessarily heightened under the condition of low loading.

In accordance with one preferable application of the present invention, the hybrid vehicle further includes: an inverter that switches electric current running through a multiphase coil of the generator; and a secondary battery that is charged with the direct current converted by the switching operation of the inverter. The control procedure causes the power generation control unit, the generator rotational speed variation unit, and the motor driving unit to implement their functions, in response to detection of an abnormal state, which does not allow the secondary battery to be charged via the inverter. The power generation utilizing the counter electromotive force has stricter restrictions, for example, on the maximum power generation, compared with the power generation utilizing the inverter. The power generation utilizing the counter electromotive force is accordingly carried out in the state that does not allow the secondary battery to be charged via the inverter.

In the hybrid vehicle of the above application, when an observed voltage level of the secondary battery is higher than the counter electromotive force utilized for the power generation via the power generation control unit, one preferable arrangement prohibits the power generation utilizing the counter electromotive force via the power generation control unit but drives the motor with electric power accumulated in the secondary battery. In the case where the secondary battery has a sufficiently high voltage level as its state of charge, the motor may be driven with the electric power taken out of the secondary battery. During a drive of the hybrid vehicle, the secondary battery may be charged with the regenerative electric power. In such cases, the hybrid vehicle advantageously uses engine brake.

In the first hybrid vehicle of the present invention, the target revolving speed of the engine may be specified, based on behavior of an accelerator pedal. The behavior of the accelerator pedal is highly correlated to the power requirement of the vehicle expected in the near future. For example, depression of the accelerator pedal leads to an increase in required power to be output to the drive shaft. The arrangement of specifying the target revolving speed of the engine by taking into account such correlation enables the upper limit of energy output from the engine to be adjusted at an earlier timing. One preferable procedure increases the rotational speed of the generator with an increase in amount of depression of the accelerator pedal. The quick response to the increase in amount of depression of the accelerator pedal significantly improves the drivability.

In accordance with another preferable application of the present invention, the target revolving speed of the engine is lowered or raised in response to detection of an increasing tendency or a decreasing tendency of an actual revolving speed of the engine relative to the target revolving speed of the engine. The engine is under the feedback control to attain the target revolving speed. Controlling the driving state of the generator instantaneously increases or decreases the actual revolving speed of the engine. The control procedure of this application lowers or increases the target revolving speed of the engine in response to a variation in actual revolving speed of the engine. This anticipates a variation in loading in the near future. Such control is especially effective when separate control units are in charge of control of the engine and control of the generator and the motor and there is some interference with transmission of the target revolving speed between the separate control units, for example, via communication. The control procedure of this application may, however, be adopted in other structures that do not require transmission of the target revolving speed in such manner.

In the hybrid vehicle of the above application, one preferable control procedure urges the power generation utilizing the counter electromotive force, when an external force makes the drive shaft inversely rotated and the motor fall into a state of power generation. When there is an insufficiency of torque output from the vehicle, for example, running on a steep ascent, the vehicle may go back. In such cases, the drive shaft is inversely rotated and the motor falls into the state of power generation. The above control procedure desirably prevents over-voltage in such cases.

In the first hybrid vehicle of the present invention, one preferable control procedure sets a maximum electric power generated by the generator with the power of the engine, specifies driving electric power consumed for driving the motor within the preset maximum electric power, based on the specified loading. The control procedure drives the generator to generate electric power that is equivalent to the driving electric power consumed by the motor, and regulates the electric current running through a multiphase coil of the motor with the generated electric power. The control procedure of this application sets the maximum electric power generated by the generator and ensures the balance of the generated electric power with the consumed electric power within the preset maximum electric power.

The present invention is also directed to a second hybrid vehicle with an engine, a generator, and a motor mounted thereon, wherein the engine outputs power through combustion of a fuel, the generator generates electric power with at least part of the power output from the engine, and the motor outputs power to a drive shaft of the hybrid vehicle. The second hybrid vehicle includes: an engine control unit that feedback controls a quantity of the fuel injected to the engine to attain a specified target revolving speed of the engine; a generative energy computation unit that computes an instantaneous magnitude of generative energy to be generated by the generator by taking into account an energy balance in a system including the engine, the generator, and the motor; a voltage measurement unit that measures a generative voltage of the generator; a control variable computation unit that computes a feedback control variable corresponding to a difference between the observed generative voltage and a target generative voltage of the generator; a generator control unit that feedback controls the generator with the calculated instantaneous magnitude of generative energy and the calculated feedback control variable; a requirement detection unit that detects a requirement on a drive of the vehicle; and a motor driving unit that calculates an output torque of the motor based on a direct torque output from the generator, which is under control of the generator control unit, and a required torque related to the detected requirement on the drive of the vehicle, and drives the motor to attain the calculated output torque.

There is also a method of controlling the hybrid vehicle, which corresponds to the arrangement of the second hybrid vehicle. The present invention is accordingly directed to a second method of controlling a hybrid vehicle, wherein an engine outputs power through combustion of a fuel, a generator provided with permanent magnets generate electric power with at least part of the power output from the engine, and a motor is driven with at least part of the electric power generated by the generator, so as to output power to a drive shaft of the vehicle. The second method includes the steps of: feedback controlling a quantity of the fuel injected to the engine to attain a specified target revolving speed of the engine; computing an instantaneous magnitude of generative energy to be generated by the generator by taking into account an energy balance in a system including the engine, the generator, and the motor; measuring a generative voltage of the generator; computing a feedback control variable corresponding to a difference between the observed generative voltage and a target generative voltage of the generator; feedback controlling the generator with the calculated instantaneous magnitude of generative energy and the calculated feedback control variable; detecting a requirement on a drive of the vehicle; and calculating an output torque of the motor based on a direct torque output from the generator, which is under control of the generator control unit, and a required torque related to the detected requirement on the drive of the vehicle, and driving the motor to attain the calculated output torque.

The second hybrid vehicle of the present invention or the corresponding second method of controlling the hybrid vehicle carries out the control according to the calculated instantaneous magnitude of generative energy to be generated by the generator as well as according to the calculated feedback control variable. The instantaneous magnitude of generative energy is calculated by taking into account the energy balance in the system including the engine, the generator, and the motor. The feedback control variable is calculated corresponds to the difference between the observed generative voltage of the generator and a target generative voltage. Even when the generative voltage of the generator varies with a variation in loading, this arrangement ensures the quick response to such a variation and makes the quantity of energy generation balance with the quantity of energy consumption. This enables the hybrid vehicle to be driven without charging or discharging the secondary battery.

In accordance with one preferable application of the present invention, the generator uses permanent magnets to form a magnetic field, and the hybrid vehicle further includes: an inverter that switches electric current running through a multiphase coil of the generator; a secondary battery that is charged with the direct current converted by the switching operation of the inverter. The control procedure stops the switching operation of the inverter and causes the generator to carry out power generation utilizing a counter electromotive force, in response to detection of a state of failure in feedback control of the generator using the feedback control variable. In the case where the feedback control of the generator falls into the state of failure, this arrangement quickly stops this feedback control and causes the generator to carry out power generation utilizing the counter electromotive force. This arrangement effectively prevents the failure of the whole control. Although there is the upper limit, the power generation utilizing the counter electromotive force enables the power generation according to the quantity of power consumption and thereby makes the quantity of energy generation balance with the quantity of energy consumption. In the case where the feedback control of the generator through the switching operation of the inverter falls into the state of failure due to some disturbance, the temporary shift to the power generation utilizing the counter electromotive force effectively recovers the total state of control.

In the second hybrid vehicle of the present invention, in a specific driving state where the motor generates electric power, for example, in the course of braking, one preferable control procedure stops the fuel injection to the engine and causes the generator to motor the engine and thereby consume the electric power generated by the motor. This arrangement enables the hybrid vehicle to use engine brake.

The present invention is also directed to a third hybrid vehicle with an engine, a generator, and a motor mounted thereon, wherein the engine outputs power through combustion of a fuel, the generator generates electric power with at least part of the power output from the engine, and the motor outputs power to a drive shaft of the hybrid vehicle. The third hybrid vehicle includes: an engine control unit that feedback controls a quantity of the fuel injected to the engine to attain a specified target revolving speed of the engine; a secondary battery that is connectable with both positive and negative power lines of a direct voltage source, which link the generator with the motor; a first contact that switches on and off connection of the secondary battery with one of the two power lines and links the secondary battery with the power line via a restriction resistor, which restricts electric current flowing out of the secondary battery; a second contact that is connected to the first contact in parallel and directly links the secondary battery with the power line; a third contact that switches on and off connection of the secondary battery with the other of the two power lines; a weld detection unit that detects a weld of the third contact; and a welding-state driving unit that opens both the first contact and the second contact after activation of the engine in response to detection of the weld of the third contact, and drives the motor with the electric power generated by the generator.

There is also a method of controlling the hybrid vehicle, which corresponds to the arrangement of the third hybrid vehicle. The present invention is accordingly directed to a third method of controlling a hybrid vehicle, wherein an engine outputs power through combustion of a fuel, a generator provided with permanent magnets generate electric power with at least part of the power output from the engine, and a motor is driven with at least part of the electric power generated by the generator, so as to output power to a drive shaft of the vehicle. The third method includes the steps of: connecting a secondary battery with both positive and negative power lines of a direct voltage source, which link the generator with the motor; interposing a first contact between the secondary battery and one of the two power lines via a restriction resistor, which restricts electric current flowing out of the secondary battery; connecting a second contact to the first contact in parallel, the second contact directly linking the secondary battery with the power line: interposing a third contact between the secondary battery and the other of the two power lines; feedback controlling a quantity of the fuel injected to the engine to attain a specified target revolving speed of the engine; detecting a weld of the third contact; and opening both the first contact and the second contact after activation of the engine in response to detection of the weld of the third contact, and driving the motor with the electric power generated by the generator.

In the third hybrid vehicle of the present invention or the corresponding third method of controlling the hybrid vehicle, even when the third contact welds, once the engine is activated, the control procedure opens the first contact and the second contact and drives the motor with the electric power generated by the generator. This arrangement cuts off the connection of the power line with the secondary battery and thus protects the first contact and the second contact from welding during a drive of the vehicle. There is no necessity that the drive of the vehicle is prohibited, because of possible welding of the first contact and the second contact. This arrangement accordingly enhances the convenience of the user while maintaining the sufficient safety. The weld of the third contact is readily detected by setting a predetermined sequence to the on-off timings of the respective contacts and monitoring an inter-terminal voltage between terminals of the secondary battery and an inter-power line voltage between the positive and negative power lines of the direct voltage source.

In the third hybrid vehicle of the present invention, one preferable control procedure measures both then inter-terminal voltage between the terminals of the secondary battery and the inter-power line voltage between the two power lines and stops a drive of the vehicle when it is determined that the observed inter-terminal voltage is equal to the observed inter-power line voltage. This state suggests welding of the first contact or the second contact.

A diversity of structures are applicable to any of the first through the third hybrid vehicles of the present invention and the hybrid vehicles in the corresponding first through the third methods discussed above. Typical structures are a series hybrid vehicle and a parallel hybrid vehicle. In one preferable example, the generator has a pair-rotor structure including a pair of rotors rotatable relative to each other and carries out power generation to attain a voltage and electric power corresponding to a sliding rotational speed of the two rotors. This structure corresponds to an electrical distribution type parallel hybrid vehicle. There is also a mechanical distribution type parallel hybrid vehicle. In this structure, the generator is linked with one shaft of a three-shaft power distributor, in which power input to and output from one shaft is automatically determined when powers input to and output from residual two shafts are specified. One example of the three-shaft power distributor is a planetary gear mechanism. Another shaft of the three-shaft power distributor is linked with an output shaft of the engine and still another shaft of the three-shaft power distributor is linked with the drive shaft of the vehicle. The parallel hybrid vehicle uses part of the power output from the engine as the driving force of the drive shaft. This desirably reduces the size of the motor in the parallel hybrid vehicle.

In one applicable structure for any of the first through the third hybrid vehicles and the corresponding first through third methods, the generator is connected to a first electric power driving circuit that causes the generator to carry out either one of a generative operation and a power operation, based on an on-off state of switching elements included in the first electric power driving circuit, and the motor is connected to a second electric power driving circuit that causes the motor to carry out either one of a power operation and a generative operation, based on an on-off state of switching elements included in the second electric power driving circuit. This corresponds to the structure of a semiconductor inverter and ensures accurate control through regulation of the switching elements. Connection of the first electric power driving circuit with the second electric power driving circuit in this structure enables the hybrid vehicle to be driven in a battery-less drive mode that is free from the connection of the battery. It is, however, also practical to have a battery drive mode that is under the connection of the battery. In the latter case, a secondary battery or a high-capacity capacitor is connected to at least the first electric power driving circuit. Such connection enables the electric power generated by the generator to be accumulated in the secondary battery or the high-capacity capacitor.

In the structure that allows the hybrid vehicle to be driven in the battery-less drive mode, one preferable embodiment provides a cutoff unit that cuts off connection between the secondary battery and the first electric power driving circuit. At least when a generative voltage by the generator is higher than an inter-terminal voltage between terminals of the secondary battery, the cutoff unit is actuated to cut off the connection between the secondary battery and the first electric power driving circuit. In the battery-less drive mode, when the secondary battery has a low voltage level, part of the generated electric power may be used to charge the secondary battery. This reduces the amount of electric power used for driving. The arrangement of cutting off the connection between the secondary battery and the first electric power driving circuit by means of the cutoff unit enables all the generated electric power to be used for driving the motor.

In the hybrid vehicle of the above structure, in response to detection of a specific state that does not allow the secondary battery to be charged via the first electric power driving circuit, one preferable procedure drives the motor with electric current that is induced by a counter electromotive force generated between terminals of the multiphase coil of the generator through the operation of the engine and runs via a rectifier arranged in combination with each switching element in the first electric power driving circuit. Even in the case of malfunction of the switching element in the first electric power driving circuit, this arrangement assures power generation by the generator. In this structure, the generated electric power is autonomously determined according to the loading. This significantly facilitates the drive of the hybrid vehicle in the battery-less drive mode.

These and other objects, features, aspects, and advantages of the present invention will become more apparent from the following detailed description of the preferred embodiments with the accompanying drawings.

DESCRIPTION OF THE PREFERRED EMBODIMENTS

Figure 1:
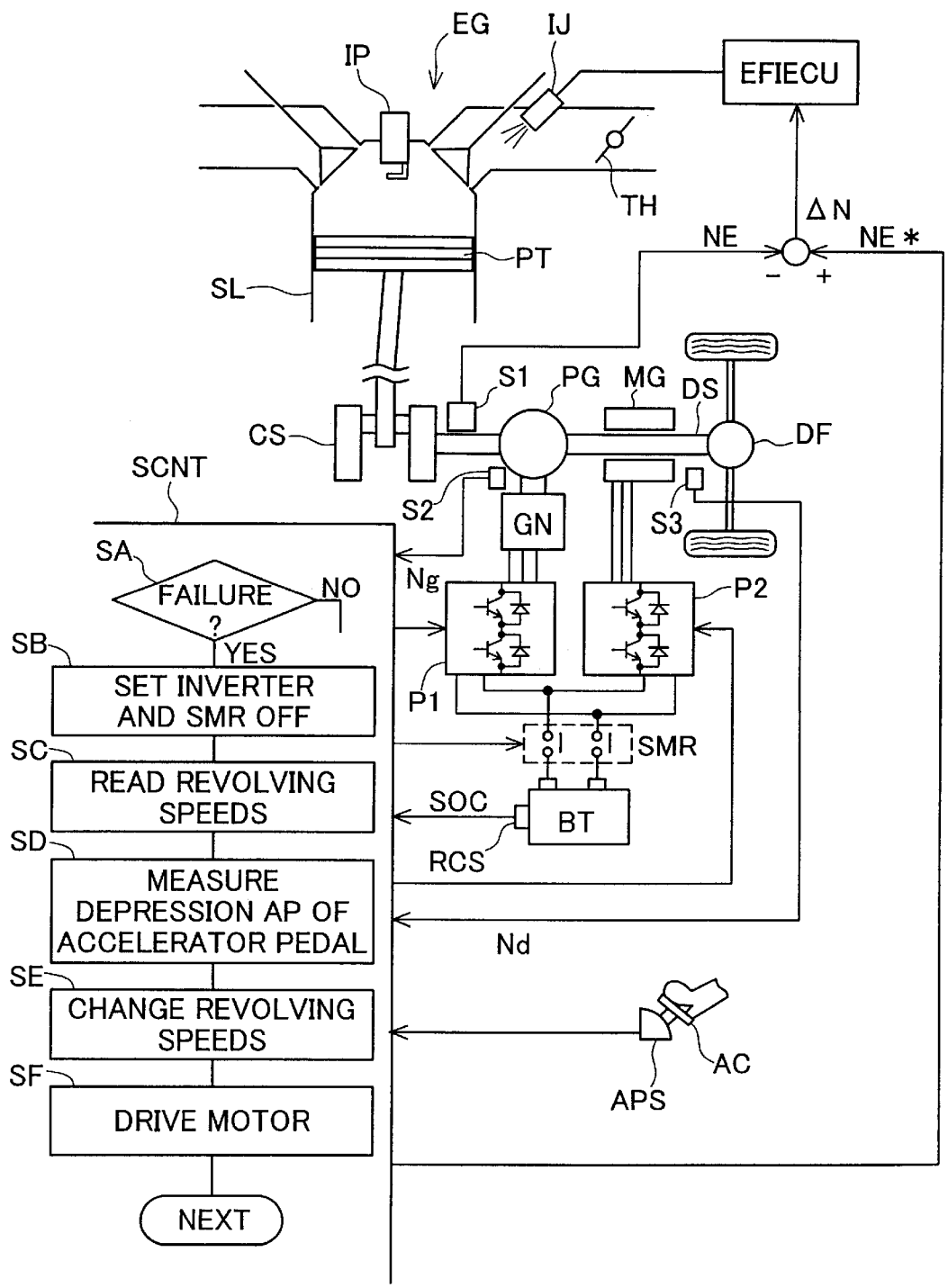
FIG. 1 shows the configuration of a hybrid vehicle in one application of the present invention.

For the purpose of clarifying the configuration and the functions of the present invention, one mode of carrying out the present invention is discussed blow. FIG. 1 shows the configuration of a hybrid vehicle in one application of the present invention. An engine EG is an internal combustion engine, in which gasoline is ejected from a fuel ejection valve IJ disposed in an intake port, taken into a cylinder SL by means of the motion of a piston PT, compressed by the piston PT, and ignited with spark of a spark plug IP to be explosively combusted. The energy of combustion is taken out via the piston PT as rotating motions of a crankshaft CS. Driving conditions of the engine EG, especially the opening of a throttle valve TH and the quantity of fuel injection, are regulated by a specific engine control unit EFIECU. The engine control unit EFIECU receives an observed revolving speed NE of the crankshaft CS measured by a speed sensor S1 and carries out feedback control with a predetermined gain G to make the observed revolving speed NE coincident with an externally given target revolving speed NE*.

A planetary gear unit PG is interposed between the crankshaft CS of the engine EG and a drive shaft DS of the vehicle. The planetary gear unit PG has three rotating shafts, which are respectively linked with the crankshaft CS, a generator GN, and the drive shaft DS. A motor MG is also disposed on the drive shaft DS. The torque transmitted from the engine EG via the planetary gear unit PG and the torque input into and output from the motor MG are transmitted to drive wheels via a differential gear DF. A speed sensor S2 and a speed sensor S3 are respectively attached to the generator GN and the drive shaft DS to measure the rotational speeds thereof.

Semiconductor inverters P1 and P2 are respectively connected to the generator GN and the motor MG as driving circuits. Controlling the on-off state of switching elements in the inverters P1 and P2 regulates the generated electric power by the generator GN and the power output from the motor MG. Power lines of these two inverters P1 and P2 are mutually linked with each other. A battery BT is connected to the power lines via a system main relay SMR. While the vehicle runs in a normal state, the system main relay SMR is kept ON (that is, in the state of connection), and the electric power generated by the generator GN is accumulated in the battery BT. The motor MG is driven by consuming the electric power accumulated in the battery BT. In this configuration, the motor MG may be used as a generator, and the generator GN may be used as a motor.

A system controller SCNT controls the inverters P1 and P2 and the system main relay SMR. The system controller SCNT connects with the speed sensors S2 and S3, an accelerator pedal sensor APS that measures the amount of depression (the step-on amount) of an accelerator pedal AC, a remaining charge sensor RCS that measures a state of charge or remaining charge SOC of the battery BT, and the inverters P1 and P2. The system controller SCNT outputs the target revolving speed NE* of the engine EG to the engine control unit EFIECU.

During a normal run, the system controller SCNT calculates the power (revolving speed×torque) to be output to the drive shaft DS of the vehicle and the electric power to be generated by the generator GN, based on the observed amount of depression of the accelerator pedal AC, an observed revolving speed Nd of the drive shaft DS, and the observed state of charge SOC of the battery BT. The system controller SCNT then controls the engine EG and the inverters P1 and P2 to attain the output of the calculated power and the generation of the calculated electric power. Whereas the engine control unit EFIECU controls the operations of the engine EG, the system controller SCNT outputs the target revolving speed NE* to indirectly regulate the output of the engine EG. The principle of this regulation is described briefly.

The engine control unit EFIECU feedback controls the revolving speed of the engine EG. When there is a difference ΔN between the target revolving speed NE* and the actual revolving speed NE, the engine control unit EFIECU regulates the quantity of air intake and the quantity of fuel injection and controls the power (revolving speed×torque) output from the engine EG, so as to make the actual revolving speed NE coincident with the target revolving speed NE*. In the mechanical distribution type hybrid vehicle shown in FIG. 1, the planetary gear unit PG is linked with the crankshaft CS. The generator GN and the drive shaft DS are linked with the other shafts of the planetary gear unit PG. The drive shaft DS is also connected to the motor MG. Controlling the generator GN and the motor MG forcibly regulates the revolving speed NE of the crankshaft CS. This arrangement enables the control that prevents the difference ΔN between the target revolving speed NE* and the actual revolving speed NE from being immediately reduced to zero even when the engine control unit EFIECU increases the quantity of air intake and the quantity of fuel injection. When the difference ΔN is not reduced, the engine control unit EFIECU further regulates the quantity of air intake and the quantity of fuel injection, so as to further increase or decrease the power possibly taken out of the engine EG. The system controller SCNT specifies the target revolving speed NE* and regulates the rotational speeds of the generator GN and the motor MG. This regulates the revolving speed NE of the crankshaft CS and freely adjusts the energy taken out of the engine EG.

Based on the hardware structure and the principle of control discussed above, the system controller SCNT shown in FIG. 1 carries out the following control procedure in response to the occurrence of a failure. The system controller SCNT first detects a failure arising, for example, in the battery BT or the inverter P1 of the generator GN (step SA), and sets the inverter P1 and the system main relay SMR OFF in response to detection of the failure (step SB). The switch-off operation disconnects the battery BT from the circuit of the inverters P1 and P2. The system controller SCNT then reads the revolving speeds of the respective shafts (step SC) and measures the amount of depression AP of the accelerator pedal (step SD). The system controller SCNT subsequently changes the rotational speed of the generator GN according to the required output of the vehicle calculated from the observed amount of depression AP and the resolving speed of the drive shaft DS (step SE), and controls the motor MG corresponding to the requirement of the vehicle (step SF).

In the state of the failure, the generator GN carries out power generation by utilizing the counter electromotive force of the generator GN, instead of the general inverter-induced power generation. In the normal state, the generator GN takes out the electric current induced by its coil, through which a magnetic field formed by permanent magnets passes, thereby implementing the power generation. In the case of malfunction of the inverter P1, however, this general mechanism of power generation is not usable. Even when the inverter P1 is at a stop, the magnetic filed passing through the coil varies with the rotation of the rotating shaft. A counter electromotive force is generated between both ends of the coil, in order to cancel the variation in magnetic field. When some load is connected to the power line, the counter electromotive force generated between both ends of the coil causes electric current to be flown into the load via a protection diode arranged in combination with each switching element in the inverter P1. The generated output by the generator GN in this state is determined autonomously according to the magnitude of electric current flowing through the loading. The generated output by utilizing the counter electromotive force is restricted to be not greater than a predetermined value, which corresponds to a preset lower limit voltage, since the voltage decreases with an increase in output electric current. This predetermined value is specified as a maximum generated power.

The above control procedure causes the vehicle to be driven in the following manner. When the system controller SCNT reads a driver's requirement from the amount of depression AP of the accelerator pedal and the revolving speed of the drive shaft DS and regulates the power (revolving speed×torque) output to the motor MG (step SF), the electric power required by the motor MG is generated by utilizing the counter electromotive force of the generator GN. The energy source of power generation by the generator GN is the engine EG. It is accordingly required to control the output of the engine EG according to the variation in generated electric power. This is attained by the feedback control of the revolving speed as discussed previously. The engine EG is under the feedback control to the target revolving speed NE* by the engine control unit EFIECU. When the revolving speed NE of the crankshaft CS is lowered, for example, due to an increase in generated output by the generator GN or an increase in loading on the drive shaft DS of the vehicle, the engine control unit EFIECU increases the quantity of air intake and the quantity of fuel injection and raises the output of the engine EG. At the same time, the rotational speed of the generator GN is varied according to the loading of the vehicle. The generator GN is accordingly controlled with the engine EG as the energy source, in order to enable a greater power to be taken out corresponding to an increase in required power to be output to the drive shaft DS.

The above control procedure allows the continuous power generation by the generator GN and enables the vehicle to be driven with the engine EG and the motor MG and safely reach a power station or any equivalent facility even in the case of malfunction of the battery BT or the inverter P1. The above description regards the limp home drive mode in the case of a malfunction. The technique of the present invention is, however, not restricted to the control procedure in the state of a failure but is applicable to any battery-less drive mode. Some modes of carrying out the present invention are discussed below as preferred embodiments.

Figure 2:
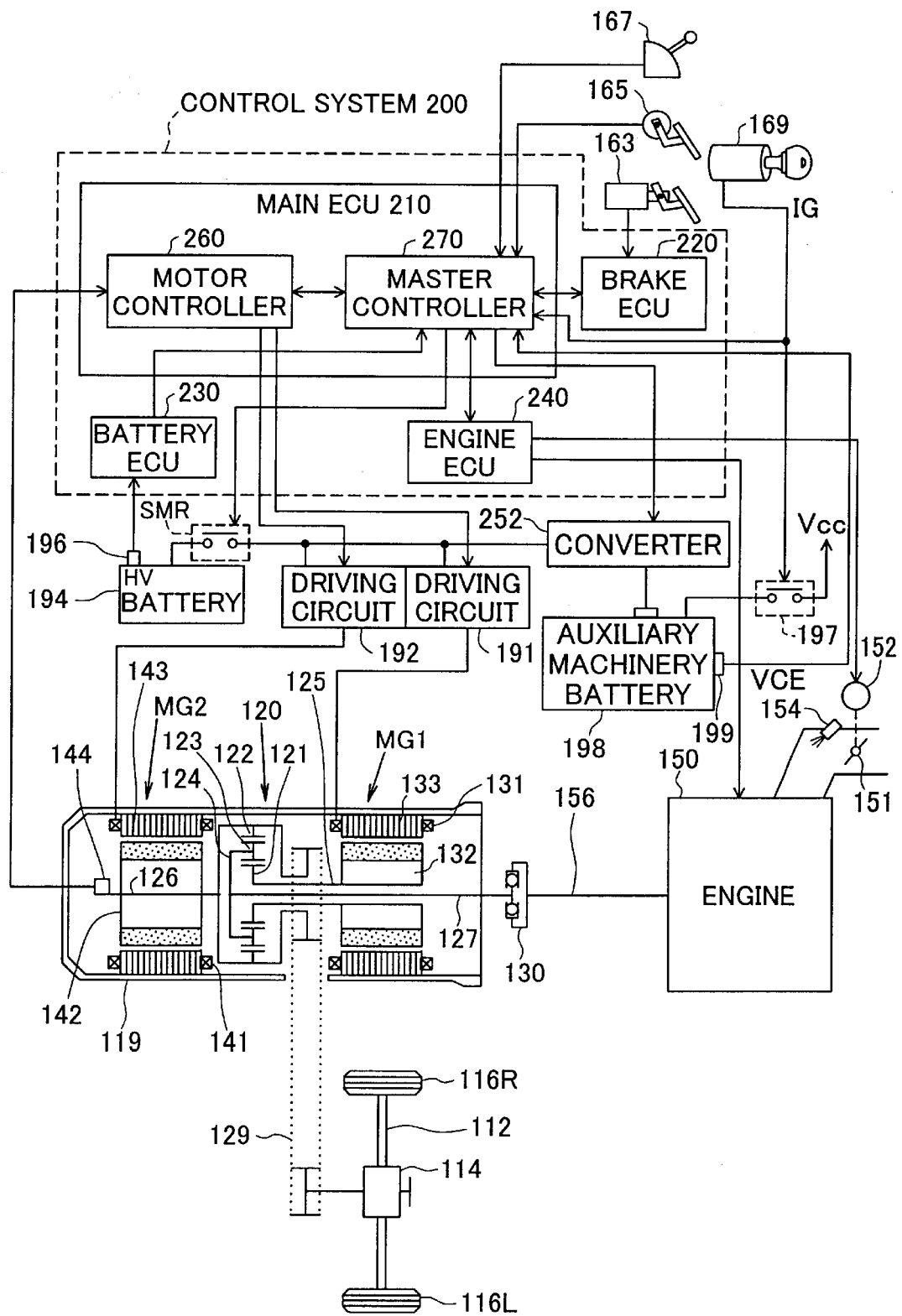
FIG. 2 schematically illustrates the general structure of a hybrid vehicle in one embodiment of the present invention.

The hybrid vehicle in one embodiment of the present invention is discussed below in the following sequence:
A. General Structure of Hybrid Vehicle
B. Basic Operations in Hybrid Vehicle
C. Configuration of Control System in Embodiment
D. Control by Engine ECU
E. Other Configuration
F. Control Procedure in Response to Detection of Failure
G. Battery-less Drive in Normal State of Inverters
H. Control Procedure in State of Welding Failure of System Main Relay
I. Structure of Electrical Distribution Type
J. Change of Drive Mode
A. General Structure of Hybrid Vehicle FIG. 2 schematically illustrates the general structure of a hybrid vehicle in one embodiment of the present invention. The hybrid vehicle has three prime movers, that is, one engine 150 and two motor generators MG1 and MG2. Here the motor generator represents the prime mover functioning as both a motor and a generator. In the description hereinafter, for simplicity of explanation, the motor generators are simply referred to as the motors. The hybrid vehicle is under the control of a control system 200.

The control system 200 includes a main ECU 210, a brake ECU 220, a battery ECU 230, and an engine ECU 240. Each of these ECUs is constructed as an integral unit, where a plurality of circuit elements including a microcomputer, an input interface, and an output interface are arranged on one identical circuit board. The main ECU 210 includes a motor controller 260 and a master controller 270. The master controller 270 functions to determine a variety of control-relating quantities, for example, distribution of the output from the three prime movers 150, MG1, and MG2.

The engine 150 is an ordinary gasoline engine that explosively combusts gasoline as fuel and rotates a crankshaft 156 with the combustion energy. The engine ECU 240 controls operations of the engine 150. The engine ECU 240 drives a throttle motor 152 to regulate the opening θ of a throttle valve 151 disposed in an air intake pipe and actuates a fuel injection valve 154 to regulate the quantity of fuel injection τ into the engine 150, based on the target revolving speed NE* directed by the master controller 270.

Figure 3:
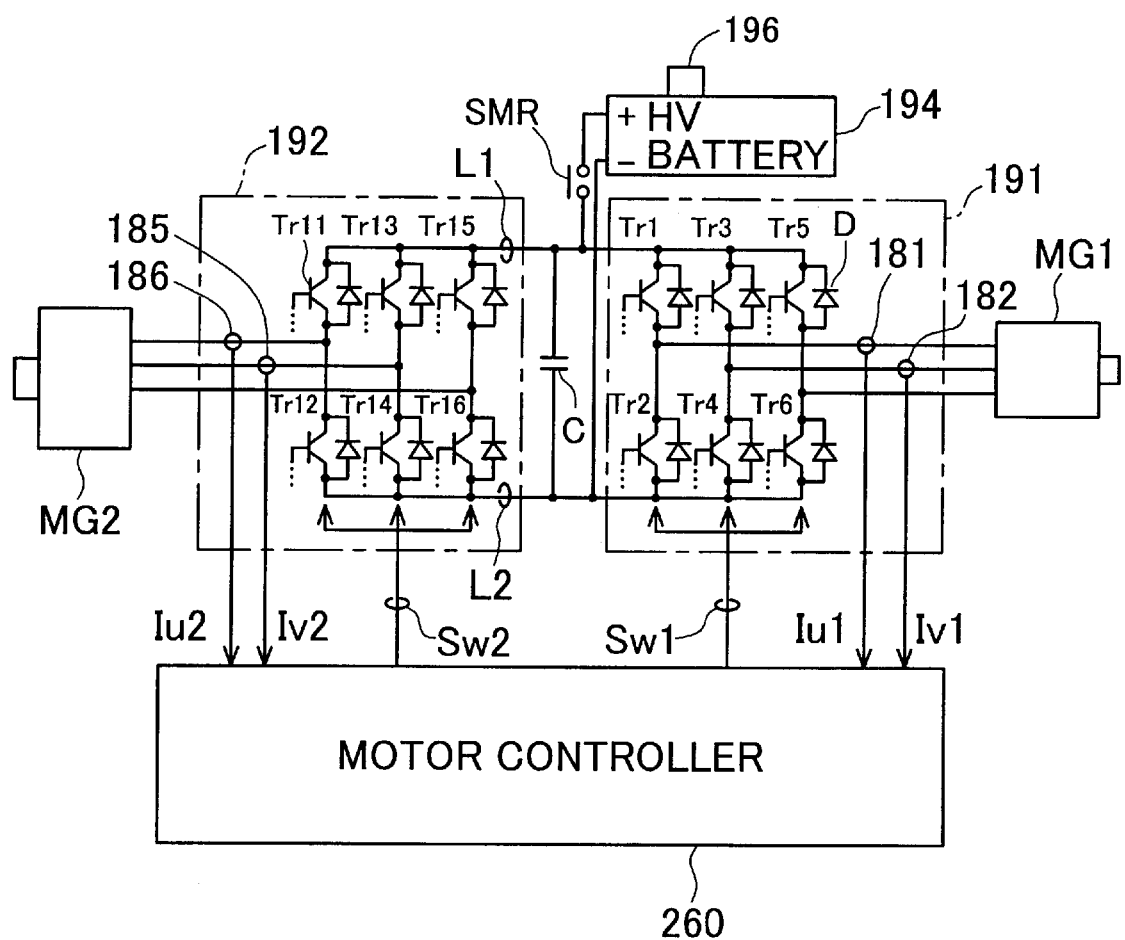
FIG. 3 shows connection of driving circuits with motors MG1 and MG2 in the hybrid vehicle of FIG. 2.

The motors MG1 and MG2 are constructed as synchronous motors, and respectively include rotors 132 and 142 with a plurality of permanent magnets mounted on outer circumferences thereof, and stators 133 and 143 with three-phase coils 131 and 141 wound thereon to form revolving magnetic fields. The stators 133 and 142 are fixed to a casing 119. The three-phase coils 131 and 141 wound on the stators 133 and 143 of the motors MG1, and MG2 are respectively connected to a secondary battery or high voltage (HV) battery 194 via driving circuits 191 and 192. FIG. 3 shows in detail the connection of the driving circuits 191 and 192 with the motors MG1 and MG2. The driving circuits 191 and 192 are constructed as transistor inverters that respectively include transistors Tr1 through Tr6 and Tr11 through Tr16, which are arranged in pairs for the respective phases, between power lines L1 and L2 connected to the HV battery 194 via a system main relay SMR. A capacitor C is interposed between the power lines L1 and L2 to relieve a voltage variation. A protection diode D is in inverse contact between a collector and an emitter of each of the switching elements Tr1 through Tr6 and Tr11 through Tr16.

The driving circuits 191 and 192 are controlled by the motor controller 260. The driving circuit 191 has current sensors 181 and 182 that respectively measure the U-phase electric current and the V-phase electric current, whereas the driving circuit 192 has similar current sensors 185 and 186. Observed values of electric current Iu1, Iv1, Iu2, and Iv2 are input into the motor controller 260. The motor controller 260 receives the observed phase currents and outputs control signals Sw1 and Sw2 to attain the desired power output. The transistors included in the driving circuits 191 and 192 are switched on and off, in response to the output control signals Sw1 and Sw2. The electric current flows between the battery 194 and the motors MG1 and MG2 via the transistors in the ON state. Each of the motors MG1 and MG2 may function as the motor that receives a supply of electric power from the HV battery 194 to be driven and rotated (hereinafter this state of operation is referred to as the power operation). While the rotor 132 or 142 is rotated by an external force, the motor MG1 or MG2 may function as the generator that causes an electromotive force to be generated between both ends of the three-phase coil 131 or 141 and charges the HV battery 194 (hereinafter this state of operation is referred to as the power generation or regenerative operation). Even when the switching elements are not switched on, the rotation of the rotor in the motor causes the magnetic field formed by the permanent magnets to pass through the three-phase coil. This varies the magnetic flux passing through the three-phase coil and generates a counter electromotive force in each phase coil. The counter electromotive force simply raises the inter-terminal voltage without any loading. When a load is connected between the power lines L1 and L2, however, the electric current runs via the protection diode D arranged in combination with each switching element. This enables the motor MG1 or the motor MG2 to carry out power generation. The power generation by utilizing the counter electromotive force will be discussed in detail later.

The HV battery 194 and the motors MG1 and MG2 are also connected to an auxiliary machinery battery 198 via a converter 252. This arrangement enables the high voltage electrical energy generated by the motors MG1 and MG2 or accumulated in the HV battery 194 to be converted into a low voltage of DC 12[V] and charges the auxiliary machinery battery 198 with the converted low voltage electrical energy.

Figure 4A:
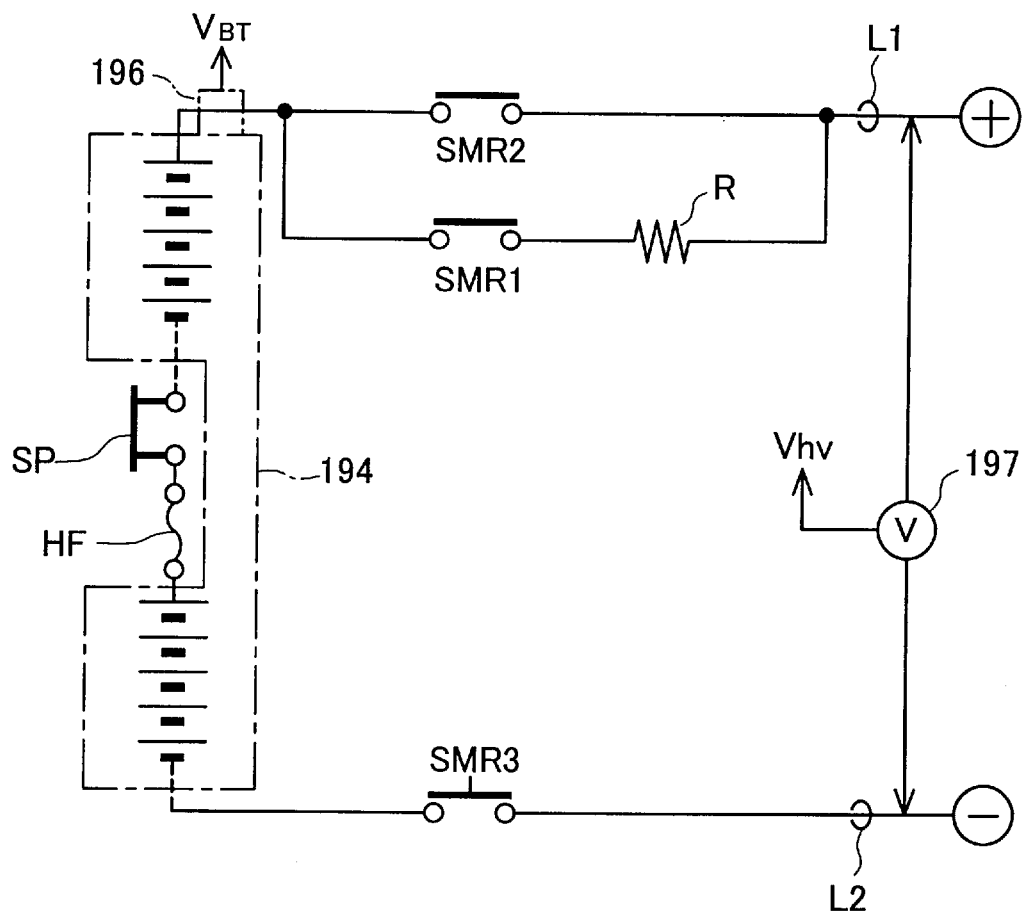
FIG. 4A shows connection of an HV battery with system main relays SMR1, SMR2, and SMR3 in the hybrid vehicle of FIG. 2.

FIG. 4A shows in detail the connection of the HV battery 194 with the system main relay SMR. The HV battery 194 is divided into two battery groups in the structure. The two battery groups are connected with each other via a high voltage fuse HF and a service plug SP. The service plug SP is provided to cut off the high voltage system for inspection, maintenance, and other purposes. Two system main relays SMR1 and SMR2 are provided in the positive power line L1 of the HV battery 194. The element actually included in the circuit is naturally the contact of each relay. For convenience of explanation, here the contact is called the system main relay SMR. The system main relay SMR1 in combination with a current restriction resistor R for restricting the electric current forms a bypass circuit, relative to the system main relay SMR2. A system main relays SMR3 is provided in the negative power line L2 of the HV battery 194.

Figure 4B:
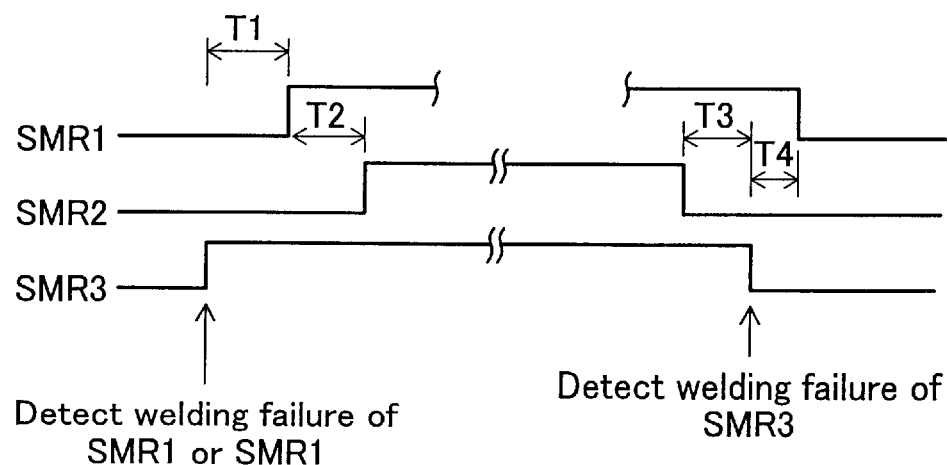
FIG. 4B shows a time sequence of on and off of relays SMR1,SMR2, and SMR3.

At the time of power supply of the high voltage system, the three system main relays SMR1, SMR2, and SMR3 are controlled according to the following procedure. In order to start the operation of the vehicle, the procedure first switches the system main relay SMR3 ON (in the closed state) and then, after elapse of a preset time T1, the system main relay SMR1 ON. The system main relays SMR2 is switched ON after elapse of another preset time T2. When the system main relay SMR1 is closed as shown in FIG. 4B, the electric current starts flowing via the current restriction resistor R to restrict the magnitude of rush current. This arrangement effectively prevents the contact of the system main relay SMR1 from being welded by the arc of large electric current. Since the electric current has already flown via the current restriction resistor R, the system main relay SMR2 in the closed state is protected from welding. At the time of cutting off the high voltage power source, as shown in FIG. 4B, the procedure first switches the system main relay SMR2 OFF (in the open state) and then, after elapse of a preset time T3, the system main relay SMR3 OFF. The system main relay SMR1 is switched OFF after elapse of another preset time T4.

The system main relays SMR1, SMR2, and SMR3 are switched on and switched off in different sequences at the time of power supply and at the time of power cut off as described above. An HV battery sensor 196 measures an output voltage Vbt of the HV battery 194, whereas a voltage sensor 197 measures a voltage Vhv of the power line. The welding failure of each system main relay SMR is detected according to the on-off state of the system main relays SMR and the relation of the voltages Vbt and Vhv. In the course of power supply, if Vbt=Vhv when the system main relay SMR3 is switched ON, the procedure determines that either the system main relay SMR1 or the system main relay SMR2 welds. In the course of power cut off, if Vbt=Vhv when the system main relay SMR1 is switched OFF, the procedure determines that the system main relay SMR3 welds. A diversity of methods are applicable to diagnose the welding failure. For example, one applicable method detects the welding failure by switching on and off the respective contacts in different sequences. Another method disposes a current sensor in a circuit passing through each contact.

Referring back to FIG. 2, the power output system from the engine 150 to the drive shaft is described. The rotating shafts of the engine 150 and the motors MG1 and MG2 are mechanically linked with one another via a planetary gear 120. The planetary gear 120 includes a sun gear 121, a ring gear 122, and a planetary carrier 124 with a planetary pinion gear 123. In the hybrid vehicle of the embodiment, the crankshaft 156 of the engine 150 is coupled with a planetary carrier shaft 127 via a damper 130. The damper 130 is provided to absorb torsional vibrations arising on the crankshaft 156. The rotor 132 of the motor MG1 is linked with a sun gear shaft 125, whereas the rotor 142 of the motor MG2 is linked with a ring gear shaft 126. The rotation of the ring gear 122 is transmitted to an axle 112 and wheels 116R and 116L via a chain belt 129 and a differential gear 114.

The control system 200 utilizes a diversity of sensors to attain the control of the whole hybrid vehicle. Such sensors include an accelerator sensor 165 that measures the amount of depression or step-on amount of an accelerator pedal by a driver, a gearshift position sensor 167 that detects the position of a gearshift lever, a brake sensor 163 that measures the step-on pressure of a brake pedal, a battery sensor 196 that measures the charge level or state of charge (SOC) of the HV battery 194, and a speed sensor 144 that measures the revolving speed of the motor MG2. The ring gear shaft 126 is mechanically linked with the axle 112 via the chain belt 129, so that the ratio of the revolving speeds of the ring gear shaft 126 to the axle 112 is fixed. The speed sensor 144 disposed on the ring gear shaft 126 accordingly detects the revolving speed of the axle 112 as well as the revolving speed of the motor MG2.

B. Basic Operations in Hybrid Vehicle

The description first regards the operations of the planetary gear 120 to explain the basic operations in the hybrid vehicle. In the planetary gear 120, when the revolving speeds of any two rotating shafts among the three rotating shafts mentioned above are specified, the revolving speed of the residual rotating shaft is automatically determined. The revolving speeds of the respective rotating shafts hold the relationship defined as Equation (1) given below:

$$Nc = Ns \times \rho/(1\rho) + Nr \times 1/(1+\rho) \quad (1)$$

where Nc, Ns, and Nr respectively denote the revolving speed of the planetary carrier shaft 127, the revolving speed of the sun gear shaft 125, and the revolving speed of the ring gear shaft 126, and ρ represents the gear ratio of the sun gear 121 to the ring gear 122 as expressed by the following equation:

ρ=[number of teeth of sun gear 121]/[number of teeth of ring gear 122]

The torques of the three rotating shafts hold fixed relations defined as Equations (2) and (3) given below, irrespective of their revolving speeds:

$$Ts = Tc \times \rho/(1+\rho) \quad (2)$$

$$Tr = Tc \times 1/(1+\rho) = Ts/\rho \quad (3)$$

where Tc, Ts, and Tr respectively denote the torque of the planetary carrier shaft 127, the torque of the sun gear shaft 125, and the torque of the ring gear shaft 126.

The functions of the planetary gear 120 enable the hybrid vehicle of the embodiment to run in a variety of conditions. For example, in the state of a drive at a relatively low speed immediately after the start of the hybrid vehicle, the motor MG2 carries out the power operation to transmit the power to the axle 112 and drive the hybrid vehicle, while the engine 150 is at a stop or at an idle.

When the speed of the hybrid vehicle reaches a predetermined level, the control system 200 causes the motor MG1 to carry out the power operation and motors and starts the engine 150 with the torque output through the power operation of the motor MG1. At this moment, the reactive torque of the motor MG1 is output to the ring gear 122 via the planetary gear 120.

When the engine 150 is driven to rotate the planetary carrier shaft 127, the sun gear shaft 125 and the ring gear shaft 126 rotate under the conditions fulfilling Equations (1) through (3) given above. The power generated by the rotation of the ring gear shaft 126 is directly transmitted to the wheels 116R and 116L. The power generated by the rotation of the sun gear shaft 125 is, on the other hand, regenerated as electric power by the first motor MG1. The power operation of the second motor MG2 enables the power to be output to the wheels 116R and 116L via the ring gear shaft 126.

In the state of a stationary drive, the output of the engine 150 is set substantially equal to a required power of the axle 112 (that is, the revolving speed×torque of the axle 112). In this state, part of the output of the engine 150 is transmitted directly to the axle 112 via the ring gear shaft 126, while the residual power is regenerated as electric power by the first motor MG1. The second motor MG2 utilizes the regenerated electric power to produce a torque for rotating the ring gear shaft 126. The axle 112 is accordingly driven at a desired revolving speed and a desired torque. The control operation of the engine 150 in the stationary driving state will be discussed later.

When there is an insufficiency of the torque transmitted to the axle 112, the second motor MG2 supplements the insufficient torque. The electric power obtained by the regenerative operation of the first motor MG1 and the electric power accumulated in the HV battery 194 are used for such supplement. In this manner, the control system 200 controls the operations of the two motors MG1 and MG2 according to the required power to be output from the axle 112.

The hybrid vehicle of the embodiment may go back in the active state of the engine 150. While the engine 150 is driven, the planetary carrier shaft 127 rotates in the same direction as that in the case of the forward drive. In this state, when the first motor MG1 is controlled to rotate the sun gear shaft 125 at a higher revolving speed than the revolving speed of the planetary carrier shaft 127, the rotating direction of the ring gear shaft 126 is inverted to the direction for the rearward drive as clearly understood from Equation (1) given above. The control system 200 makes the second motor MG2 rotated in the direction for the rearward drive and regulates the output torque, thus enabling the hybrid vehicle to go back.

In the planetary gear 120, the planetary carrier 124 and the sun gear 121 may be rotated while the ring gear 122 is at a stop. The engine 150 is accordingly driven while the vehicle is at a stop. For example, when the HV battery 194 has a low charge level, the engine 150 is driven and causes the first motor MG1 to carry out the regenerative operation and charge the HV battery 194. The power operation of the first motor MG1 in the stationary state of the vehicle, on the other hand, motors and starts the engine 150 with the output torque.

C. Configuration of Control System in Embodiment

Figure 5:
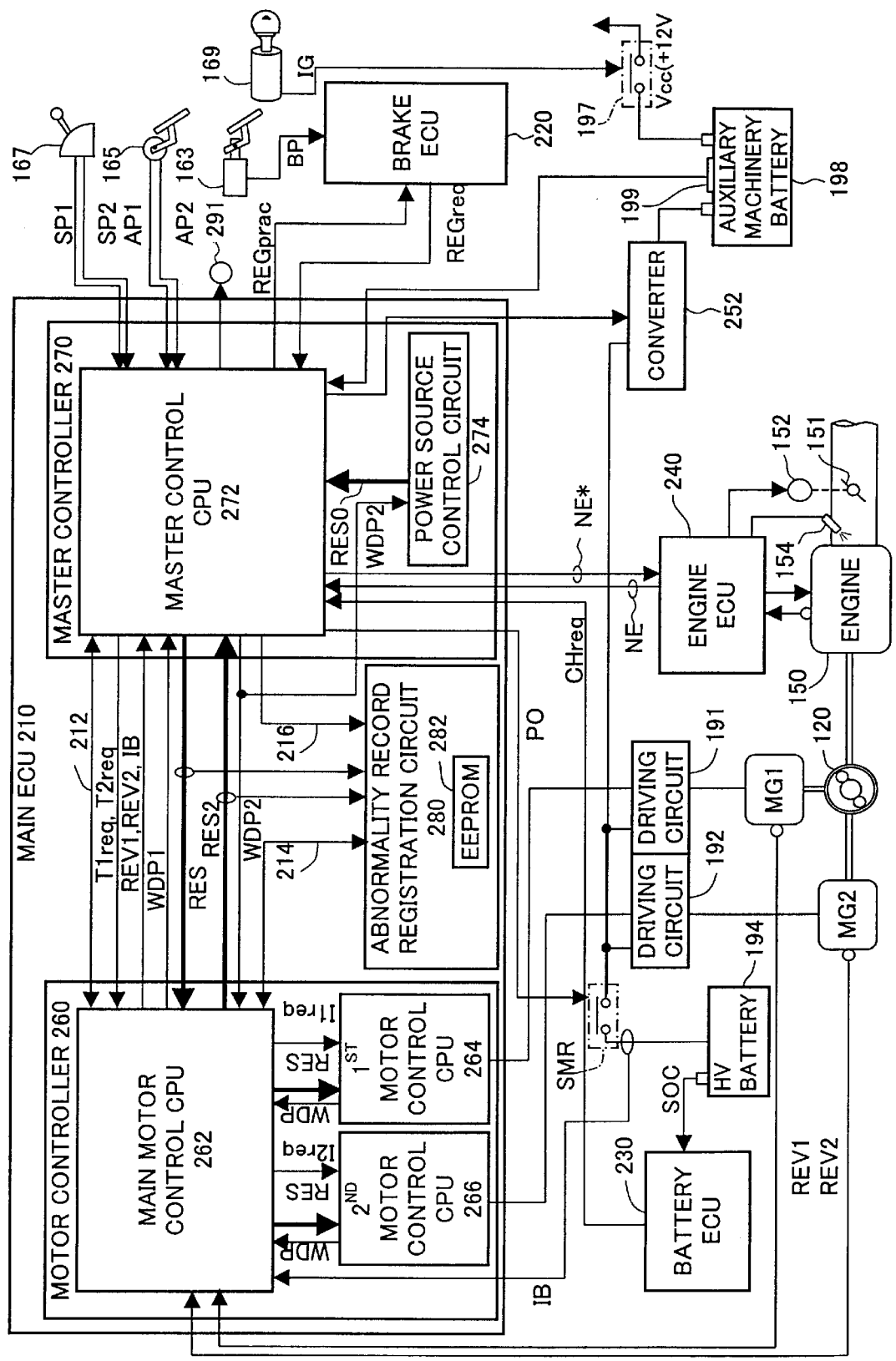
FIG. 5 is a block diagram illustrating the general configuration of a control system in the hybrid vehicle.

FIG. 5 is a block diagram illustrating the detailed configuration of the control system 200 in this embodiment. The master controller 270 includes a master control CPU 272 and a power source control circuit 274. The motor controller 260 includes a main motor control CPU 262 and two motor control CPUs 264 and 266 that respectively control the two motors MG1 and MG2. Each of the CPUs is constructed as a one-chip microcomputer including a CPU, a ROM, a RAM, an input port, and an output port (not shown).

The master control CPU 272 functions to determine the control-relating quantities, for example, the distribution of the revolving speeds and the torques of the three prime movers 150, MG1, and MG2 and transmit a diversity of required values to the other CPUs and ECUs, so as to control the operations of the respective prime movers. In order to attain such control, accelerator position signals AP1 and AP2 representing the accelerator position or opening, gearshift position signals SP1 and SP2 representing the gearshift position, and the ignition signal IG that represents an ignition-related operation and is transmitted from the ignition sensor 169 are directly connected to an input port of the master control CPU 272. The master control CPU 272 also receives a brake signal BP transmitted from the brake sensor 163 via the brake ECU 220. Both the accelerator sensor 165 and the gearshift position sensor 167 have a dual structure, that is, include two sensor elements. The master control CPU 272 accordingly receives the two accelerator position signals AP1 and AP2 and the two gearshift position signals SP1 and SP2. The master control CPU 272 also controls the on-off state of the system main relays SMR to connect and cut off the high voltage power source from the HV battery 194 as discussed above. For the purpose of such on-off control, the master control CPU 272 monitors the state of the ignition sensor 169 that detects a turning motion of an ignition key. Indicators and lamps provided on an inner panel are connected to an output port of the master control CPU 272. In the illustration of FIG. 5, only a diagnosis lamp 291 is shown as a typical example. The master control CPU 272 controls its output port to directly light these indicators and lamps.

As illustrated in FIG. 5, the master control CPU 272 is connected with the converter 252 that converts the high voltage direct current of the HV battery 194 into low voltage direct current and with a voltage sensor 199 that is mounted on the auxiliary machinery battery 198 to measure the voltage of the auxiliary machinery battery 198 and output a measurement signal VCE. The ignition sensor 169 outputs the starting requirement signal IG in response to a turning motion of the ignition key. The starting requirement signal IG switches the relay 197 on to allow supply of the low voltage power source Vcc. The master control CPU 272 receives the supply of the low voltage power source Vcc, switches on and off the system main relays SMR according to the voltage VCE of the auxiliary machinery battery 198, and controls the operations of the converter 252 when required. The power source control circuit 274 incorporated in the master controller 270 has the function of a monitoring circuit that monitors abnormality in the master control CPU 272.

The main motor control CPU 262 transmits required electric currents I1req and I2req to the two motor control CPUs 264 and 266, based on required torques T1req and T2req of the two motors MG1 and MG2 given by the master control CPU 272. The motor control CPUs 264 and 266 respectively output the control signals Sw1 and Sw2 according to the required electric currents I1req and I2req, so as to control the driving circuits 191 and 192 and drive the motors MG1 and MG2. The speed sensors of the motors MG1 and MG2 feed revolving speeds REV1 and REV2 of the motors MG1 and MG2 back to the main motor control CPU 262. The master control CPU 272 receives the revolving speeds REV1 and REV2 of the motors MG1 and MG2 as well as a value of electric current IB supplied from the HV battery 194 to the driving circuits 191 and 192, which are fed back from the main motor control CPU 262.

The battery ECU 230 monitors the state of charge or charge level SOC of the HV battery 194 and supplies a required value of charging CHreq of the HV battery 194, when required, to the master control CPU 272. The master control CPU 272 determines the output of each prime mover by taking into account the required value of charging CHreq. In the case of a requirement for charging, the master control CPU 272 causes the engine 150 to output a greater power than the value required for the drive and distributes part of the output power to the charging operation by means of the first motor MG1.

The brake ECU 220 carries out control to balance a hydraulic brake (not shown) with the regenerative brake by the second motor MG2. This is because the second motor MG2 carries out the regenerative operation to charge the HV battery 194 in the course of braking the hybrid vehicle of the embodiment. In accordance with a concrete procedure, the brake ECU 220 transmits a required regenerative power REGreq to the master control CPU 272, based on the brake pressure BP measured by the brake sensor 163. The master control CPU 272 specifies the operations of the motors MG1 and MG2 in response to the required regenerative power REGreq and feeds an actual regenerative power REGprac back to the brake ECU 220. The brake ECU 220 regulates the amount of braking by the hydraulic brake to an adequate value, based on the observed brake pressure BP and the difference between the required regenerative power REGreq and the actual regenerative power REGprac.

D. Control by Engine ECU

The engine ECU 240 controls the engine 150 according to the target revolving speed NE* transmitted from the master control CPU 272 as discussed below. The engine ECU 240 basically carries out the feedback control of the revolving speed. The master control CPU 272 specifies the target revolving speed NE*. The engine ECU 240 obtains the actual revolving speed NE of the engine 150 and calculates the difference $\Delta N$ between the actual revolving speed NE and the target revolving speed NE*. When the actual revolving speed NE is lower than the target revolving speed NE*, the engine ECU 240 controls the throttle motor 152 to widen the opening $\theta$ of the throttle valve 151. The engine ECU 240 also controls the air fuel ratio. When the throttle valve 151 is open to increase the quantity of air intake, the quantity of fuel injection $\tau$ increases accordingly. The procedure of feedback control carries out the PID control with a high gain G1 in a range of significantly large difference $\Delta N$ between the actual revolving speed NE and the target revolving speed NE*. When the difference $\Delta N$ decreases to be within a predetermined range $\pm E1$, the control procedure changes the gain to a value G2 that is lower than G1. When the difference $\Delta N$ further decreases to enter a very narrow range $\pm E2$ (E2<E1), the control procedure varies the gain by a predetermined skipping value, in order to make the revolving speed difference $\Delta N$ kept in this narrow range $\pm E2$. Even in the control system where the response has a time lag of first order as in the case of the engine 150, this arrangement ensures the stability of control and makes the actual revolving speed coincident with the target revolving speed.

The throttle opening $\theta$ is anyway widened with an increase in difference $\Delta N$. The hybrid vehicle of the embodiment regulates the difference ΔN, so as to adjust the output (revolving speed×torque) from the engine 150. In order to enhance the output from the engine 150, the hybrid vehicle carries out the control to cause the difference ΔN between the target revolving speed NE* and the actual revolving speed NE. The control may raise the target revolving speed NE* or regulate the rotational speeds of the motors MG1 and MG2 connected to each other via the planetary gear 120 according to Equation (1) given above, so as to forcibly lower the revolving speed of the crankshaft 156.

Under the condition that the feedback control has caused the engine 150 to be driven at the target revolving speed NE* (the difference ΔN=0), a decrease in reactive torque applied to the crankshaft 156 immediately raises the revolving speed NE of the engine 150. The decrease in reactive toque is caused, for example, by decreasing the amount of depression AP of the accelerator pedal or by lowering the load of the drive shaft according to the configuration of the ground, for example, a change from an ascent to a descent. The raised revolving speed NE causes the revolving speed difference ΔN. The engine ECU 240 narrows the opening θ of the throttle valve 151 and decreases the output of the engine 150, in order to cancel the difference ΔN. When the revolving speed of the engine 150 is lowered by the increased loading, on the contrary, there is also the revolving speed difference ΔN. The engine ECU 240 widens the opening θ of the throttle valve 151 and immediately increases the output of the engine 150, in order to cancel the difference ΔN. The output of the engine 150 is also variable by varying the target revolving speed NE*.

As described above, while the engine ECU 240 feedback controls the revolving speed of the engine 150, the master controller 270 sets the conditions to cause the revolving speed difference ΔN, so as to enable a desired power to be taken out of the engine 150. Even in the case of an abrupt variation in loading, this control procedure does not require updating the target output given to the engine 150. The engine ECU 240 transmits the actual revolving speed NE of the engine 150 to the master control CPU 272, so that the master control CPU 272 is always informed of the actual revolving speed NE of the engine 150.

E. Other Configuration

As described above, the master control CPU 272 determines the target revolving speed of the engine 150 and the outputs of the motors MG1 and MG2 and transmits the required values to the ECU 240 and the CPUs 264 and 266, which take in charge of the actual controls. The ECU 240 and the CPUs 264 and 266 control the corresponding prime movers in response to the required values. The hybrid vehicle is accordingly driven with the adequate power output from the axle 112 according to the driving state. In the course of braking, the brake ECU 220 cooperates with the master control CPU 272 to regulate the operations of the respective prime movers and the hydraulic brake. This arrangement attains the desirable braking operation that does not make the driver uneasy or uncomfortable, while allowing regeneration of electric power.

The two control CPUs 262 and 272 are connected to an abnormality record registration circuit 280 via bidirectional communication lines 214 and 216 to read and write data. There is another bidirectional communication line 212 interposed between the master control CPU 272 and the main motor control CPU 262 to transmit a variety of data including verification of the validity of the processing.

An input port of the abnormality record registration circuit 280 receives reset signals RES1 and RES2 transmitted between the master control CPU 272 and the main motor control CPU 262. The abnormality record registration circuit 280 registers the input reset signals RES1 and RES2 into an internal EEPROM 282. Namely the abnormality record registration circuit 280 has the function of monitoring generation of the reset signal and registering the generation record in response to a reset of the master control CPU 272 or the main motor control CPU 262.

F. Control Procedure in Response to Detection of Failure

The following describes the control procedure carried out when any abnormality arises in the HV battery 194 or the driving circuit 191. As described previously, when there is a failure in the HV battery 194 or in the driving circuit 191 to interfere with the normal on-off operation of the transistors Tr functioning as the switching elements, the control procedure sets the system main relay SMR OFF and enables the vehicle to be driven in the battery-less drive mode. In such cases, the motor MG1 functions as the generator utilizing the counter electromotive force. The failure of the HV battery 194 is identified, for example, when the state of charge or remaining charge SOC obtained from the observed voltage by the HV battery sensor 196 is not varied by the charging and discharging control via the driving circuit 191 or when an abnormal temperature level is detected by a temperature sensor (not sown). The failure of the switching elements in the driving circuit 191 is identified, based on the measurements of the current sensors 181 and 182.

Figure 6:
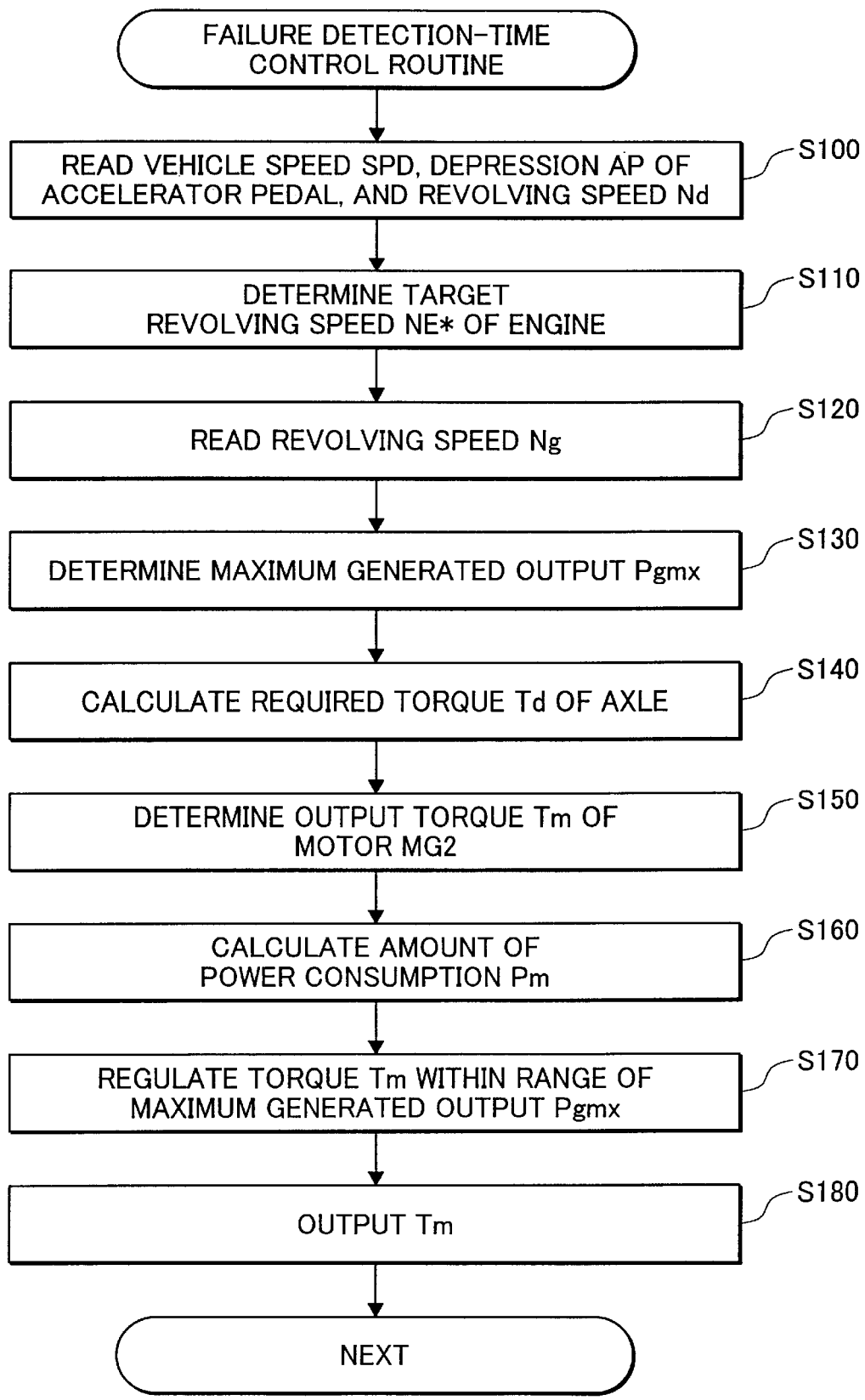
FIG. 6 is a flowchart showing a failure detection-time control routine for battery-less drive executed in the embodiment.

FIG. 6 is a flowchart showing a failure detection-time control routine executed in the embodiment. This control routine is activated at the time of detection of a failure and carried out after the system main relay SMR is set OFF. The system main relay SMR is set OFF at the time of detection of the failure, since the power generation of the motor MG1 by utilizing the counter electromotive force generally lowers the inter-power line voltage between the power lines L1 and L2 of the driving circuit 191 below the inter-terminal voltage of the HV battery 194. When the comparison between the inter-power line voltage and the inter-terminal voltage shows that the inter-terminal voltage of the HV battery 194 is low, the control procedure may not set the system main relay SMR OFF.

Figure 7:
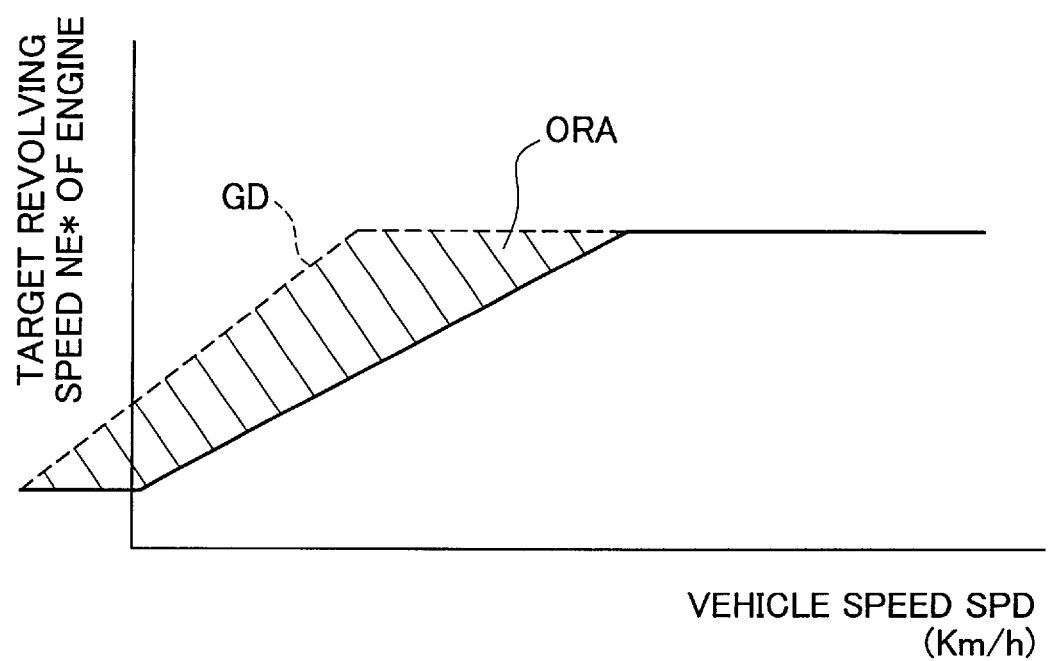
FIG. 7 is a graph showing the target revolving speed NE* of an engine plotted against the vehicle speed SPD.

When the program enters the control routine shown in the flowchart of FIG. 6, the procedure first reads the current vehicle speed SPD, the amount of depression AP of the accelerator pedal, and the revolving speed Nd of the drive shaft (that is, the axle) at step S100, and determines the target revolving speed NE* of the engine 150 based on these inputs at step S110. The concrete process of step S110 reads the target revolving speed NE* of the engine 150 from a map provided for control in the state of failure as shown in FIG. 7. In the map of FIG. 7 used in this embodiment, the target revolving speed NE* of the engine 150 increases with an increase in vehicle speed SPD. The solid curve of FIG. 7 represents the base characteristic without taking into account the amount of depression AP of the accelerator pedal. In the actual state, however, the target revolving speed NE* is varied according to the amount of depression AP of the accelerator pedal. In a low vehicle speed range, the target revolving speed NE* is raised with an increase in amount of depression AP of the accelerator pedal. This low vehicle speed range is shown as a hatched area ORA in FIG. 7. In a concrete example, when the driver depresses the accelerator pedal to the full open position, the target revolving speed NE* is set higher by 700 rpm than the base value. When the accelerator pedal is depressed to the half open position, the target revolving speed NE* is set higher by 300 rpm than the base value. The curve of broken line GD in FIG. 7 represents the characteristic of the target revolving speed NE* under the condition that the accelerator pedal is depressed to the full open position.

Another procedure may set the engine speed NE* by taking into account the differential of the depression amount AP of the accelerator pedal. When the driver depresses the accelerator pedal, this procedure raises the target revolving speed NE* in advance while the vehicle speed SPD is still low. Namely this procedure raises the target revolving speed NE* to be higher than the level set in stationary state according to the map of the target revolving speed NE* against the vehicle speed SPB and the depression amount AP of the accelerator pedal. This method effectively ensures the future output of the engine 150 that will be required in a short time period.

The revolving speed Nd of the axle or drive shaft, the revolving speed NE of the engine 150, and the revolving speed Ng of the motor MG1 hold a relationship following Equation (1) given above. Namely there is the relationship of:

$$NE = Ng \times \rho/(1+\rho) + Nd \times 1/(1+\rho) \tag{1a}$$

Figure 8:
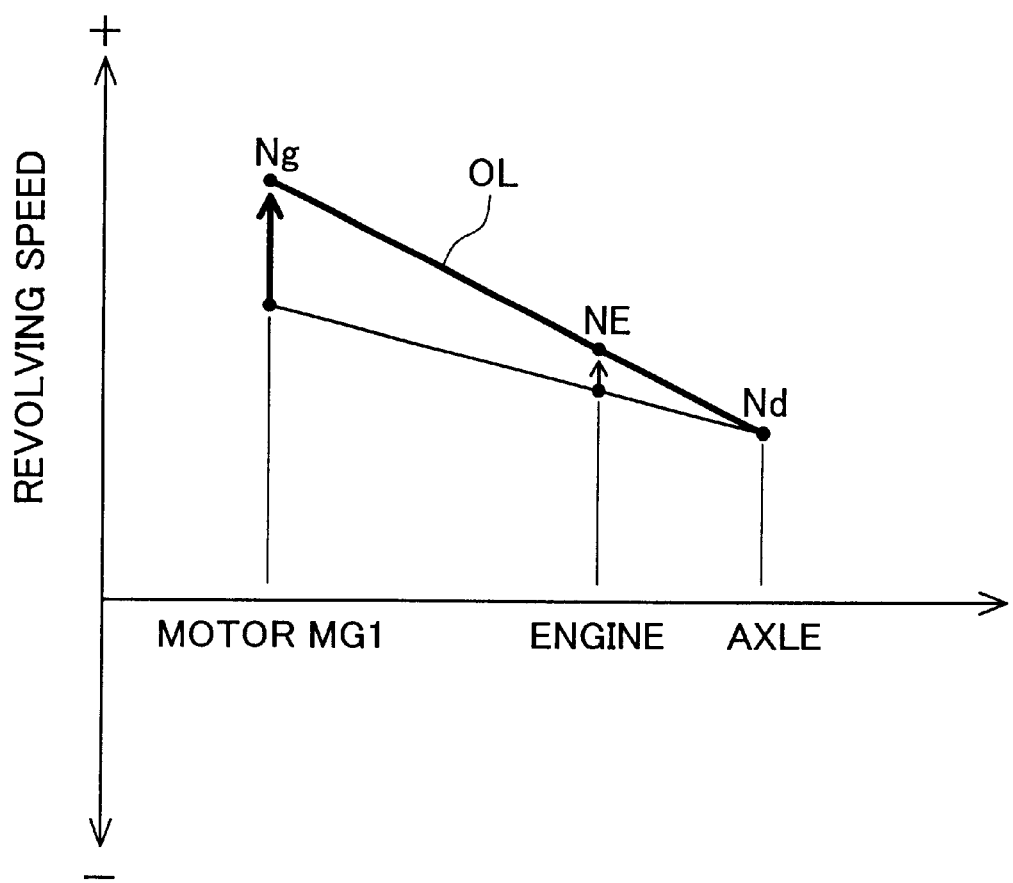
FIG. 8 is a graph showing an operation line OL in the mechanical distribution type hybrid vehicle.

The revolving speed Nd of the axle is obtained unequivocally from the vehicle speed SPD. Setting the revolving speed NE of the engine 150 thus unequivocally determines the revolving speed Ng of the motor MG1. This relationship is shown in the map of FIG. 8. The three revolving speeds Nd, NE, and Ng always form a straight line (operation line OL). The revolving speed of the motor MG1 is thus adjusted by regulating the revolving speed NE of the engine 150. There is a time lag in the control of the engine 150. Setting the target revolving speed NE* does not immediately make the actual revolving speed of the motor MG1 coincident with the calculated revolving speed. The procedure then reads the revolving speed Ng of the motor MG1 at step S120.

In the arrangement of the embodiment, the revolving speed Ng of the motor MG1 functioning as the generator is varied according to the vehicle speed SPD and the depression amount AP of the accelerator pedal. This is because a maximum generated output Pgmx, which is taken out of the motor MG1 functioning as the generator by the power generation utilizing the counter electromotive force, depends upon the revolving speed Ng of the motor MG1. The procedure determines the maximum generated output Pgmx of the motor MG1 at step S130.

Figure 9:
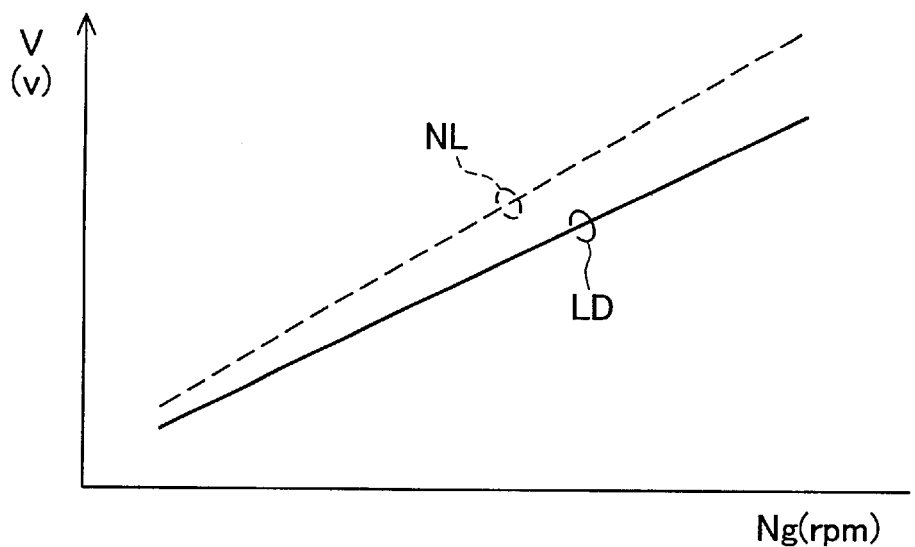
FIG. 9 is a graph showing the counter electromotive force V plotted against the revolving speed Ng of the motor MG1 to describe the state of power generation utilizing the counter electromotive force.
Figure 10:
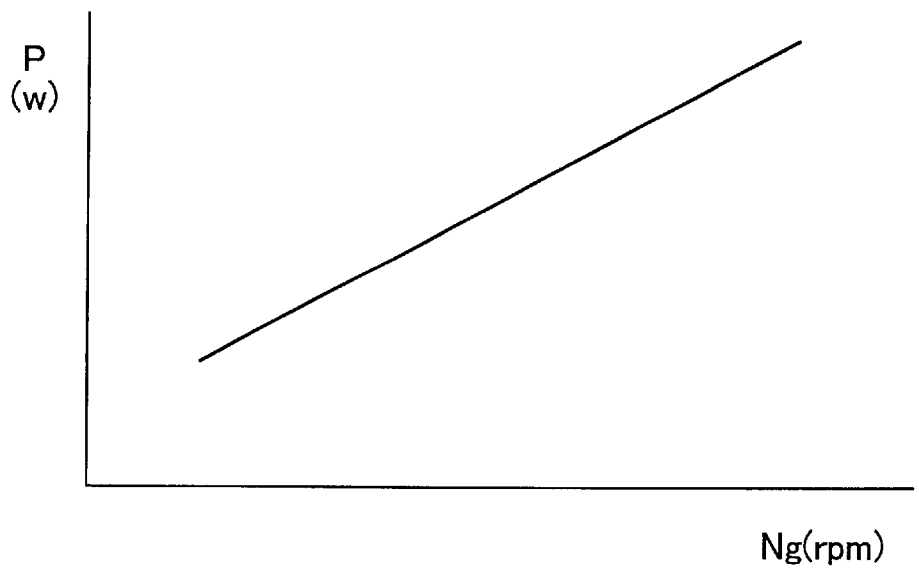
FIG. 10 is a graph showing the amount of power generation P by the motor MG1 plotted against the revolving speed Ng of the motor MG1.
Figure 11:
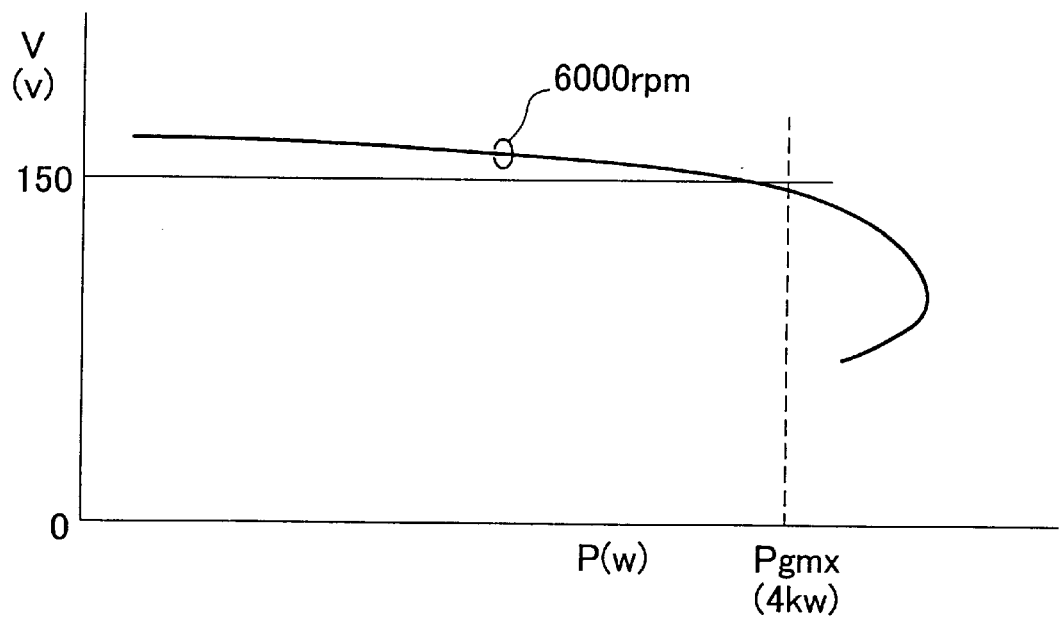
FIG. 11 shows a maximum generated output Pgmx at a predetermined revolving speed in the motor MG1.

The process of determining the maximum generated output Pgmx is described in detail. In the case of the power generation by utilizing the counter electromotive force, as shown by the characteristic curves of non-loading power generation NL and maximum power generation LD in FIG. 9, the voltage V of power generation increases with an increase in revolving speed Ng of the motor MG1. The generated output P increases with an increase in revolving speed Ng as shown in FIG. 10. Under the condition of a fixed revolving speed Ng, the voltage V of power generation decreases with an increase in generated output P as shown in FIG. 11. When the generated output P exceeds a predetermined value Pgmx, the voltage V abruptly decreases. The voltage V of power generation lower than a preset value does not allow the converter 252 to be actuated. The procedure of the embodiment thus sets the upper limit of power generation that ensures the voltage V of power generation to be not less than 150 V, as the maximum generated output Pgmx. The graph of FIG. 11 shows the characteristic curve when the revolving speed Ng of the motor MG1 is equal to 6000 rpm. In this case, the maximum generated output Pgmx is approximately equal to 4 kw.

The procedure inputs the revolving speed Ng of the motor MG1 at step S120 and reads the maximum generated output Pgmx corresponding to the input revolving speed Ng from the map stored in advance at step S130. The procedure subsequently calculates a required torque Td of the axle from the observed vehicle speed SPD and the depression amount AP of the accelerator pedal at step S140 and determines an output torque Tm of the motor MG2 to attain the required torque Td at step S150. The procedure then calculates an amount of power consumption Pm at step S160 and regulates the output torque Tm to restrict the calculated amount of power consumption Pm to the maximum generated output Pgmx at step S170. The procedure subsequently controls the on-off state of the switching elements or transistors Tr11 through Tr16 in the driving circuit 192 and causes the motor MG2 to carryout the power operation with the torque Tm at step S180.

The power generation utilizing the counter electromotive force does not carry out the on-off control of the transistors in the first driving circuit 191. As long as no load is connected between the terminals of the motor MG1, when the rotor with the permanent magnets attached thereto rotates to vary the density of magnetic flux passing through the three-phase coil 131, the counter electromotive force is generated between the terminals to cancel the variation in density of the magnetic flux. As shown in FIG. 3, when the counter electromotive force is generated between the terminals of each phase coil in the motor MG1 and a load is connected between the power lines L1 and L2, the electric current runs via the protection diode connected between the collector and the emitter of each of the transistors Tr1 through Tr6. The magnitude of the electric current depends upon the magnitude of the loading. Namely the power generation utilizing the counter electromotive force automatically generates the electric power corresponding to the electric power consumed by the loading within the range of the maximum generated output Pgmx. In the arrangement of the embodiment, the magnitude of the loading is adjusted by regulating the ON time of the transistors Tr11 through Tr16 for the power operation of the MG2.

When there is any failure in the HV battery 194 or in the first driving circuit 191, the arrangement of the embodiment sets the system main relay SMR OFF and enables the vehicle to be driven in the battery-less drive mode. In the battery-less drive mode, the engine 150 is driven and the motor MG1 is used as the generator utilizing the counter electromotive force. This ensures the power of several kilowatts. In the case of the limp home drive in the state of failure, this arrangement ensures a certain level of vehicle speed and a driving distance determined by the remaining quantity of fuel (gasoline) in the vehicle. For example, when some abnormality arises in the vehicle during a drive on an express way, this arrangement enables the vehicle to be driven at the certain level of vehicle speed and thereby ensures the safety of the drive.

The procedure of the embodiment varies the target revolving speed NE* of the engine 150 according to the required power of the vehicle and accordingly regulates the revolving speed Ng of the motor MG1 functioning as the generator, so as to adjust the maximum generated output Pgmx in the power generation utilizing the counter electromotive force. This arrangement effectively prevents the engine 150 from being continuously driven in a high speed range and overheated. The revolving speeds of the engine 150 and the motor MG1 vary according to the output of the vehicle. This advantageously makes the driver feel compatibility during a drive of the vehicle.

Figure 12:
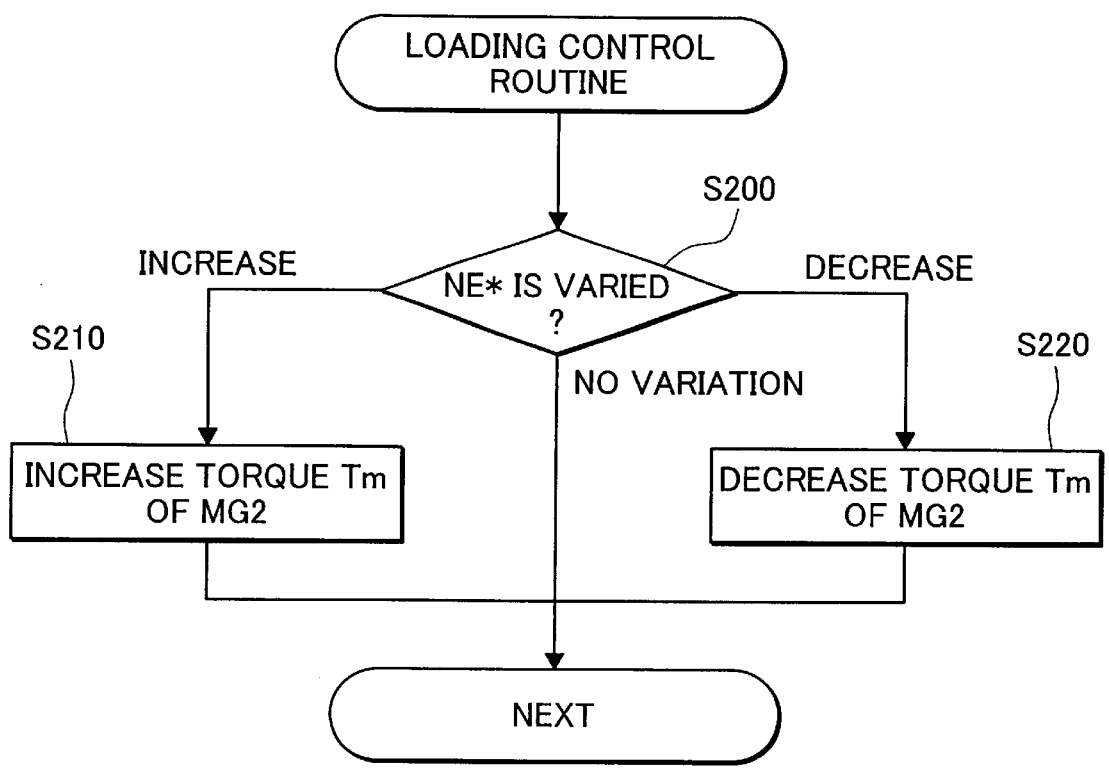
FIG. 12 is a flowchart showing an essential part of a loading control routine executed by a master control CPU.
Figure 14:
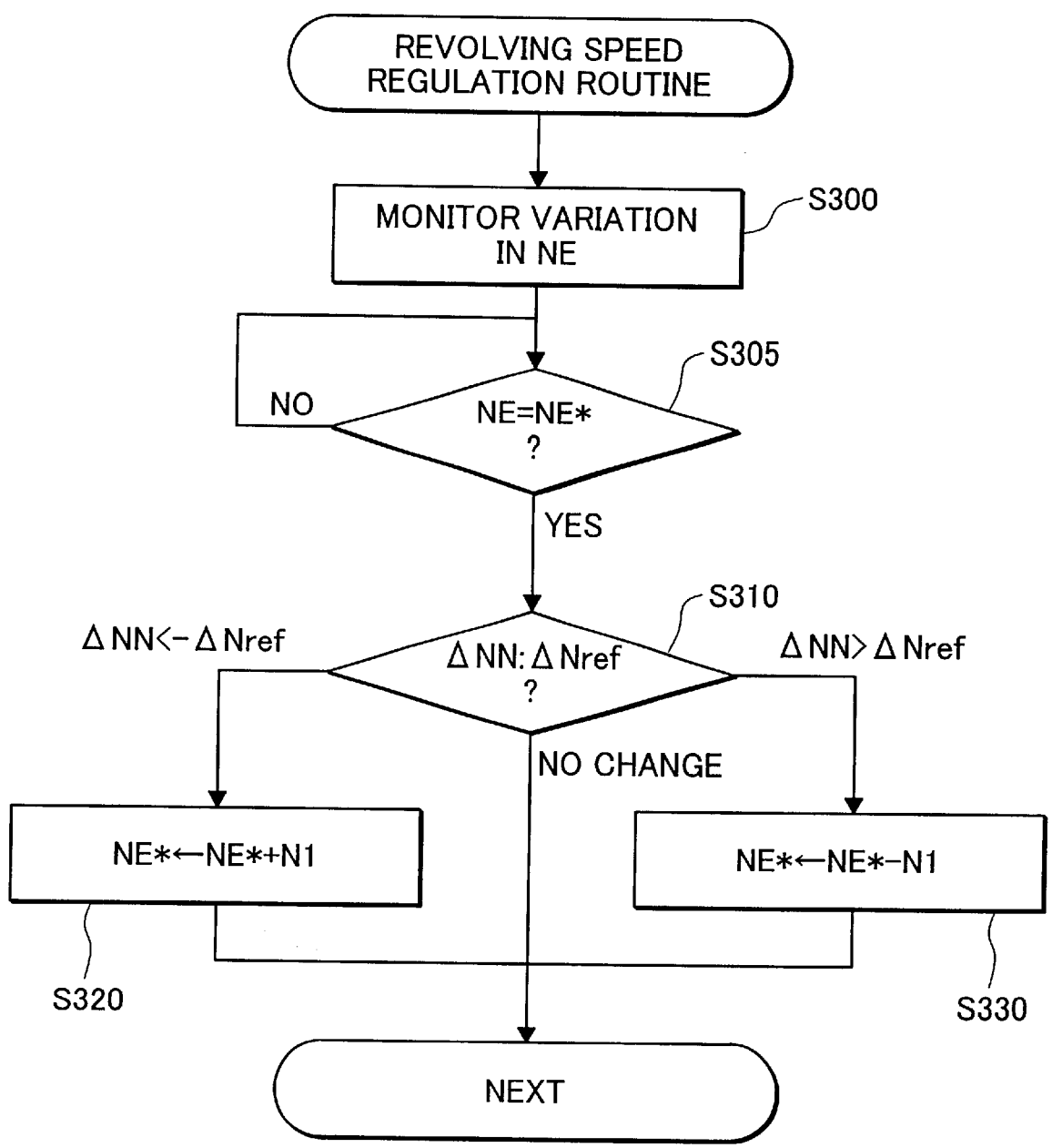
FIG. 14 is a flowchart showing an essential part of a target revolving speed regulation routine executed by an engine ECU.

The arrangement of the embodiment discussed above may be subjected to some modification. In the structure of the embodiment, the engine ECU 240 carries out the feedback control of the revolving speed of the engine 150, and the master control CPU 272 transmits the target revolving speed NE* to the engine ECU 240 through communication. In one modified structure discussed below, there is no communication between the master control CPU 272 and the engine ECU 240. In this example, the engine ECU 240 independently regulates the target revolving speed NE* of the engine 150. One example of the processing carried out in this modified structure is shown in the flowcharts of FIGS. 12 and 14. The flowchart of FIG. 12 shows a control routine executed by the master control CPU 272, and the flowchart of FIG. 14 shows a control routine executed by the engine ECU 240.

Figure 13:
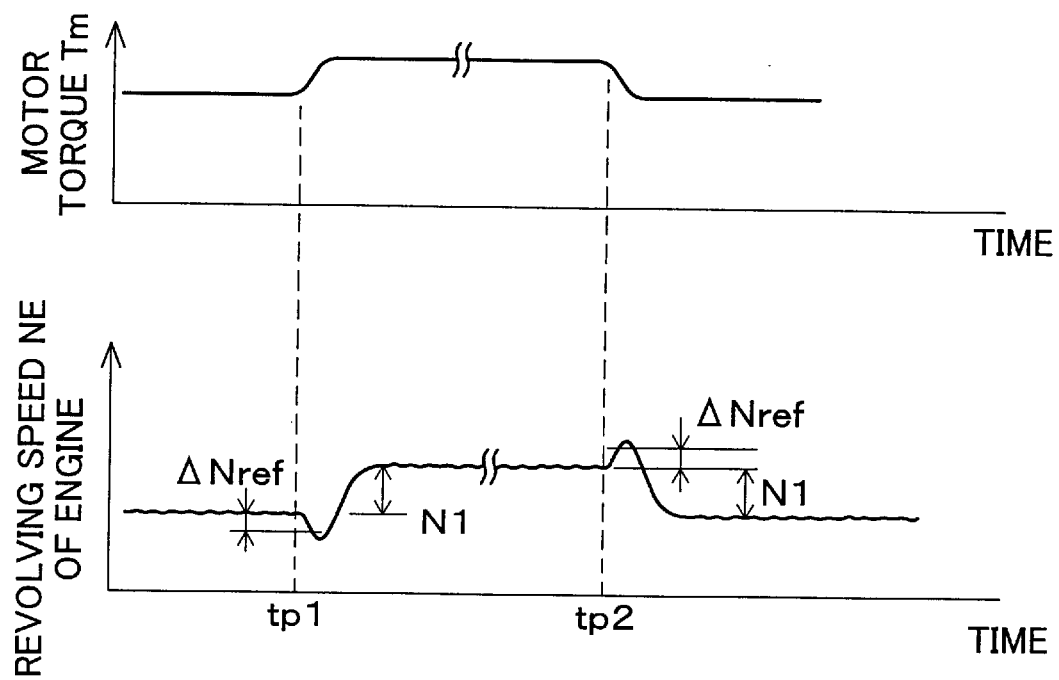
FIG. 13 shows a variation in motor torque Tm and a variation in revolving speed NE of the engine.

When the master control CPU 272 determines at step S200, based on the driving conditions of the vehicle, that an increase in revolving speed of the engine 150 is required, the master control CPU 272 increases the output torque Tm of the motor MG2 in a short time period at step S210. This process increases the electric current flowing through the motor MG2 and thereby enhances the loading torque of the motor MG1 functioning as the generator. The loading torque is applied to the engine 150, so that the revolving speed NE of the engine 150 is temporarily lowered at a timing tp1 shown in the graph of FIG. 13. When the master control CPU 272 determines at step S200, based on the driving conditions of the vehicle, that a decrease in revolving speed of the engine 150 is required, on the other hand, the master control CPU 272 decreases the output torque Tm of the motor MG2 in a short time period at step S220. This process decreases the electric current flowing through the motor MG2 and thereby reduces the loading torque of the motor MG1 functioning as the generator. The revolving speed NE of the engine 150 is thus temporarily heightened at a timing tp2 shown in the graph of FIG. 13.

Referring to the flowchart of FIG. 14, the engine ECU 240 continuously monitors the revolving speed of the engine 150 at step S300. When the actual revolving speed NE of the engine 150 coincides with the target revolving speed NE* at step S305, the engine ECU 240 carries out the series of processing discussed below. The engine ECU 240 compares a variation $\Delta NN$ in revolving speed NE per unit time with a predetermined range $\pm \Delta Nref$ at step S310. When $\Delta NN<-\Delta Nref$, the engine ECU 240 increments the target revolving speed NE* by a preset value N1 from the current level at step S320. When $\Delta NN>\Delta Nref$, on the other hand, the engine ECU 240 decrements the target revolving speed NE* by the preset value N1 from the current level at step S330. In the case where the variation $\Delta NN$ in revolving speed NE is within the predetermined range $\pm \Delta Nref$, the engine ECU 240 does not change the target revolving speed NE* of the engine 150 but keeps the current level.

While the master control CPU 272 and the engine ECU 240 do not transmit data, the above control procedure enables the master control CPU 272 to vary the revolving speed of the engine 150. In the structure that allows communication between the master control CPU 272 and the engine ECU 240, even when there is a failure in the communication system, this arrangement enables the revolving speed of the engine 150 to approach a desired level and exerts the effects of the embodiment discussed above. This arrangement regulates the output of the engine according to the required torque of the vehicle and enables the vehicle to be driven with the required torque.

The above procedure regulates the target revolving speed NE* in response to a variation in actual revolving speed NE of the engine 150. In another modified arrangement, the engine ECU 240 directly detects the behavior of the accelerator pedal, that is, the variation in depression amount AP of the accelerator pedal (the operation in the opening direction or the operation in the closing direction). The engine ECU 240 regulates the target revolving speed NE* based on the detected behavior of the accelerator pedal.

G. Battery-less Drive in Normal State of Inverters

The arrangement of the above embodiment causes the vehicle to be driven in the battery-less drive mode in which the power generation is carried out by utilizing the counter electromotive force on the assumption that there is a failure in the HV battery 194 or another related element. The vehicle may alternatively be driven in another type of battery-less drive mode in which the power generation does not utilize the counter electromotive force but uses the driving circuits 191 and 192 functioning as the inverters. The vehicle may be driven in this type of battery-less drive mode in the normal state or in an abnormal state with a failure in the HV battery 194 while there is no abnormality in the driving circuits 191 and 192 functioning as the inverters. When there is an abnormality only in the HV battery 194, the battery-less drive separating the HV battery 194 advantageously ensures a drive of the high power performance. The battery-less drive still exerts some advantages in the normal state where the HV battery 194 and the driving circuits 191 and 192 are all normal. The drive of the vehicle in the state that the amount of power generation completely balances with the amount of power consumption does not require either charging or discharging the HV battery 194, thus desirably extending the life of the HV battery 194. In the case where the HV battery 194 has an excessively high temperature through the charging or discharging process, the battery-less drive with the HV battery 194 temporarily separated favorably gives the time of cooling does the HV battery 194.

In the case of the battery-less drive in the normal state, it is required to make the amount of power generation by the motor MG1 balance with the amount of power consumption by the motor MG2. This is attained by the series of processes discussed below:

(1) Calculation of required output of power generation Pgr: The process specifies the current amount of power consumption by the motor MG2 including a loss of the system, so as to calculate a required output of power generation Pgr, which represents the amount of electric power to be generated by the motor MG1 functioning as the generator.

(2) Calculation of target torque Tgi: The process calculates a target torque Tgi of the motor MG1 functioning as the generator as the sum of a base torque Tgb and a PI controlled value Tgf through voltage feedback of the driving circuits 191 and 192.

(3) Calculation of maximum amount of power consumption Pmmx: The process calculates a maximum amount of power consumption Pmmx by the motor MG2.

(4) Calculation of target torque Tm: The process calculates a target torque Tm of the motor MG2, so as to make the amount of power generation by the motor MG1 balance with the amount of power consumption by the motor MG2.

The battery-less drive in the normal state is described below with referring to the flowchart of FIG. 15. When the program enters the control routine of FIG. 15, the procedure first reads the current vehicle speed SPD, the amount of depression AP of the accelerator pedal, and the revolving speed Nd of the drive shaft (that is, the axle) at step S400, and determines the target revolving speed NE* of the engine 150 based on these inputs at step S410. The concrete process of step S410 reads the target revolving speed NE* of the engine 150 from a map provided in advance. Here the map is different from the map for control in the state of failure shown in FIG. 7 but is set according to the driving efficiency of the engine 150.

The procedure then reads the values of the respective sensors to obtain the revolving speeds Ng and Nm of the motors MG1 and MG2 and the current torque Tmi−1 of the motor MG2 at step S420. Here the subscript 'i−1' represents the current observed value, and the subscript 'i' represents the controlled value to be output.

The procedure then successively calculates the required output of power generation Pgr at step S430, the target torque Tgi of the motor MG1 from the base torque Tgb and the voltage feedback controlled torque Tgf at steps S440 and S450, the maximum amount of power consumption Pmmx at step S460, and the target torque Tm of the motor MG2 at step S470. The details of these processes are discussed below.

(1) Process of Calculating Required Output of Power Generation Pgr (Step S430)

The process first calculates energy Pm currently consumed by the motor MG2 from the revolving speed and the torque obtained at step S420 according to Equation (11) given below:

$$Pm = (2\pi/60) \times Nm \times Tmi-1 \quad (11)$$

Figure 16:
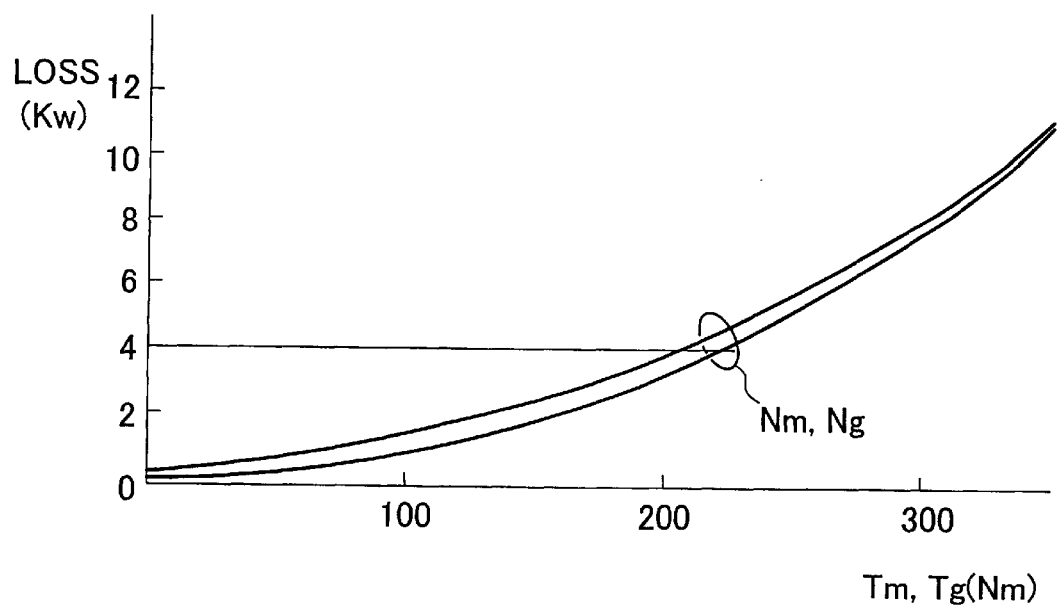
FIG. 16 is a graph showing a loss in the motor MG1.

The process then reads a current loss Pml of the motor system MG2 corresponding to the revolving speed Nm and the current torque Tmi−1 of the motor MG2 from a loss map. The loss of the motor system increases with an increase in torque and with an increase in revolving speed. One example of the loss map is shown in FIG. 16.

The process subsequently reads a current loss Pgl of the generator system corresponding to the revolving speed Ng and the current torque Tgi−1 of the motor MG1 functioning as the generator from a similar loss map. The process then calculates the required output of power generation Pgr according to Equation (12) given below:

$$Pgr = -Pm - Pml - Pgl - Pdc \quad (12)$$

In Equation (12), Pdc denotes a loss of the converter 252. Although the loss Pdc can be regarded as a fixed value, for the enhanced accuracy, the loss Pdc may be read corresponding to the voltages on the higher side and the lower side and the consumed electric current on the lower side from a map. The above series of processing gives the required output of power generation Pgr according to Equation (12).

(2) Process of Calculating Target Torque Tgi of Generator (Steps S440 and S450)

The target torque Tgi of the motor MG1 functioning as the generator is obtained as the sum of the base torque Tgb and the voltage feedback controlled torque Tgf as expressed:

$$Tgi \leftarrow Tgb + Tgf \quad (13)$$

The base torque Tgb is obtained by simplified calculation of Equation (14) given below, based on the fundamental relation of energy=revolving speed×torque:

$$Tgb = (60/2\pi) \times Pgr/Ng \quad (14)$$

The base torque Tgb of the motor MG1 functioning as the generator is namely obtained by dividing the required output of power generation Pgr, which represents the amount of electric power to be generated by the motor MG1, by the revolving speed Ng of the motor MG1. The processing of step S440 calculates the base torque Tgb according to Equation (14).

The process subsequently calculates the voltage feedback controlled torque Tgf. The calculation specifies the PI controlled value Tgf according to a difference ΔV between the observed voltage of power generation of the motor MG1 and a target voltage level. The motor MG1 is supposed to generate the required output of power generation Pgr, which is calculated at step S430 and expected to be consumed by the motor MG2. The amount of power generation is thus supposed to balance the amount of power consumption. The loading of the motor MG2, however, abruptly changes due to the varying road surface and other factors. Power generation of only the required output accordingly causes an excess or an insufficiency in generated output with a variation in loading. This leads to an abrupt change of the voltage between the power lines L1 and L2. The procedure accordingly measures the d.c. voltage of the power lines and carries out feedback control to quickly compensate for the voltage variation. The processing of step S450 adds the PI controlled value Tgf through the feedback of the d.c. voltage to the base torque Tgb, so as to specify the target torque Tgi of the motor MG1.

(3) Process of Calculating Maximum Amount of Power Consumption Pmmx (Step S460)

Figure 17:
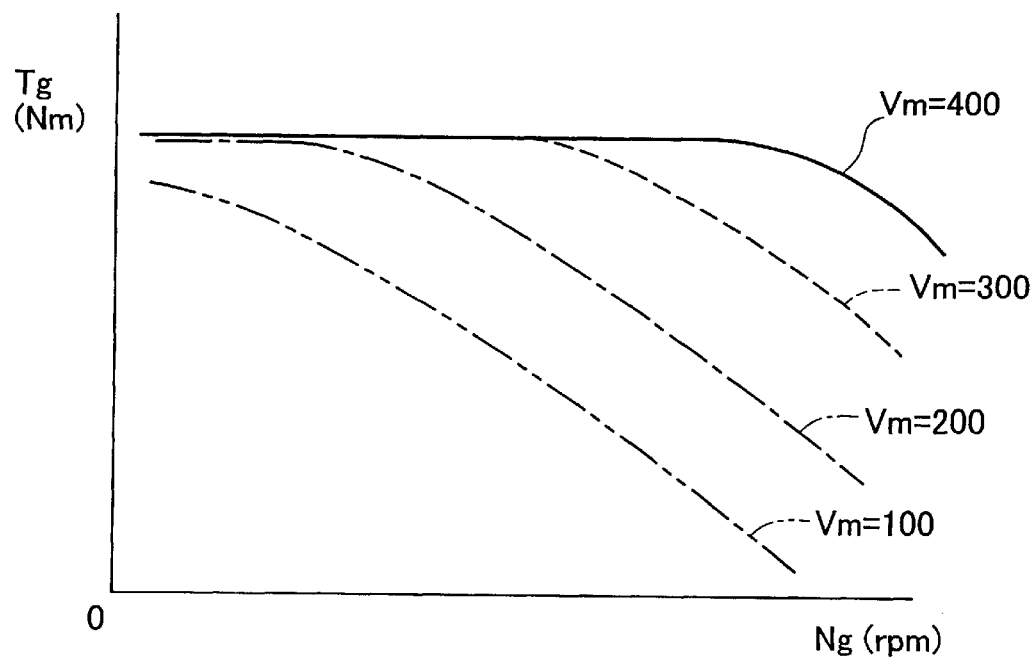
FIG. 17 is a graph showing the torque Tg plotted against the revolving speed Ng of the motor MG1 with regard to the voltage Vm as a parameter.

The process first obtains a limit torque or maximum torque Tgmx of the motor MG1 functioning as the generator. The maximum torque is read from a torque map shown in FIG. 17. The torque Tg of the motor MG1 is specified by the revolving speed Ng and the voltage Vm. In the case of power generation via the driving circuit 191 functioning as the inverter, the torque Tg at a predetermined revolving speed Ng is reduced with a decrease in voltage Vm. The maximum torque thus obtained may, however, not be fully taken out of the motor MG1. The torque of the motor MG1 functioning as the generator is the reactive torque against the torque of the engine 150 and can thus not exceed the output torque of the engine 150. The maximum torque Tgmx read from the torque map of FIG. 17 is accordingly restricted to a maximum torque Temx of the engine 150. In the case where the maximum torque Temx of the engine 150 is less than the maximum torque Tgmx read from the torque map of FIG. 17, the maximum torque Temx of the engine 150 is set to the maximum torque Tgmx of the motor MG1. In the mechanical distribution type hybrid vehicle of the embodiment, the torque Tg of the motor MG1 and the torque Te of the engine 150 hold the following relation:

$$Tg = (1+\rho) \times Te/\rho \quad (3a)$$

This corresponds to the case where Ts=Tg and Tc=Te in Equation (3). In this embodiment, Tg=Te/3.6.

Figure 18:
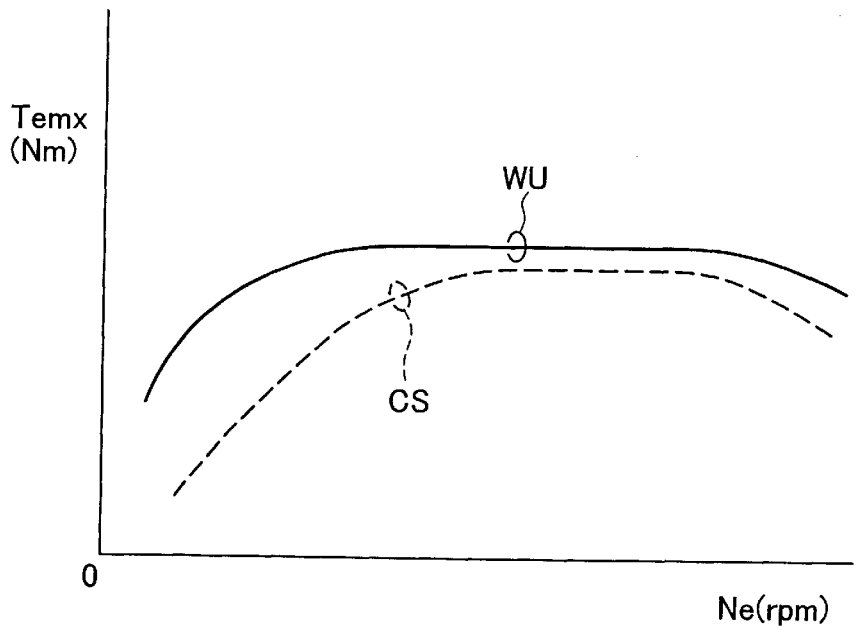
FIG. 18 is a graph showing the relationship between the maximum output torque Temx and the revolving speed Ne of the engine.

Here the maximum torque Temx of the engine 150 is read from a torque map provided in advance. One example of the torque map is shown in FIG. 18. The maximum torque Temx of the engine 150 is set with regard to the revolving speed Ne and the cooling water temperature THW of the engine 150 as parameters. In the graph of FIG. 18, a solid curve WU represents the revolving speed-torque characteristic at the warm-up time and a broken curve CS represents the revolving speed-torque characteristic at the cold time. Strictly speaking, the maximum torque Temx of the engine 150 is affected by the altitude (that is, the difference in air density) and the temperature of intake air. These parameters may be reflected on the maximum torque Temx in a multi-dimensional version of the torque map shown in FIG. 18.

The maximum torque Temx read from the torque map of FIG. 18 may alternatively be corrected with the altitude and the temperature of intake air.

After determining the maximum torque Tgmx of the motor MG1 restricted to the maximum torque Temx of the engine 150, the process obtains a loss Pglmx under such output conditions (that is, the revolving speed Ng and the torque Tgmx). The loss Pglmx of the motor MG1 is read corresponding to the revolving speed Ng and the maximum torque Tgmx from the loss map of FIG. 16 as in the case of the loss of the motor MG2. The process then calculates maximum generated energy Pgmx of the motor MG1 functioning as the generator from the maximum torque Tgmx and the revolving speed Ng according to Equation (15) given below:

$$Pgmx=(2\pi/60)\times Ng\times Tgmx \quad (15)$$

The current loss Pml of the motor system has already been read from the loss map of FIG. 16. The maximum energy Pmmx consumed by the motor MG2 is calculated from the maximum generated energy Pgmx of the motor MG1 functioning as the generator, the loss Pglmx of the motor MG1 and the loss Pml of the motor MG2. The maximum energy Pmmx consumed by the motor MG2 is accordingly equal to the remainder obtained by subtracting the losses from the maximum generated output:

$$Pmmx = \text{Maximum generated output} - \text{Losses}$$

$$= -Pgmx - Pml - Pglmx - Pdc \quad (16)$$

Here the maximum generated output Pgmx of the motor MG1 has the minus sign. This is because the consumed energy is expressed as the plus sign and the generated energy is expressed as the minus sign in the equations.

The energy balance is expressed as:

$$I\times V=(Pm+Pml)+(Pg+Pgl)+Pdc \quad (17)$$

The first term on the right side represents the sum of the consumed energy and the loss in the motor MG2, the second term represents the sum of the generated energy and the loss in the motor MG1, and the third term represents the loss of the converter 252. When it is assumed that all the generated electric power is consumed by the motor, $I\times V=0$ in Equation (17). Namely Equation (17) is rewritten as:

$$Pm=-Pg-Pml-Pgl-Pdc \quad (18)$$

Whereas Equation (16) gives the maximum consumed energy under the conditions of the maximum torque and the maximum loss, Equation (18) gives the consumed energy at the time of stationary drive and is essentially equivalent to Equation (12).

(4) Process of Calculating Target Torque Tm of Motor MG2 (Step S470)

At the final stage in the series of the processing, the process determines a required torque Tmr of the motor MG2. The required torque Tmr is calculated by subtracting a direct torque (Te/ρ) from a required torque Td of the axle as expressed:

$$Tmr=Td-Te/\rho \quad (19)$$

Figure 19:
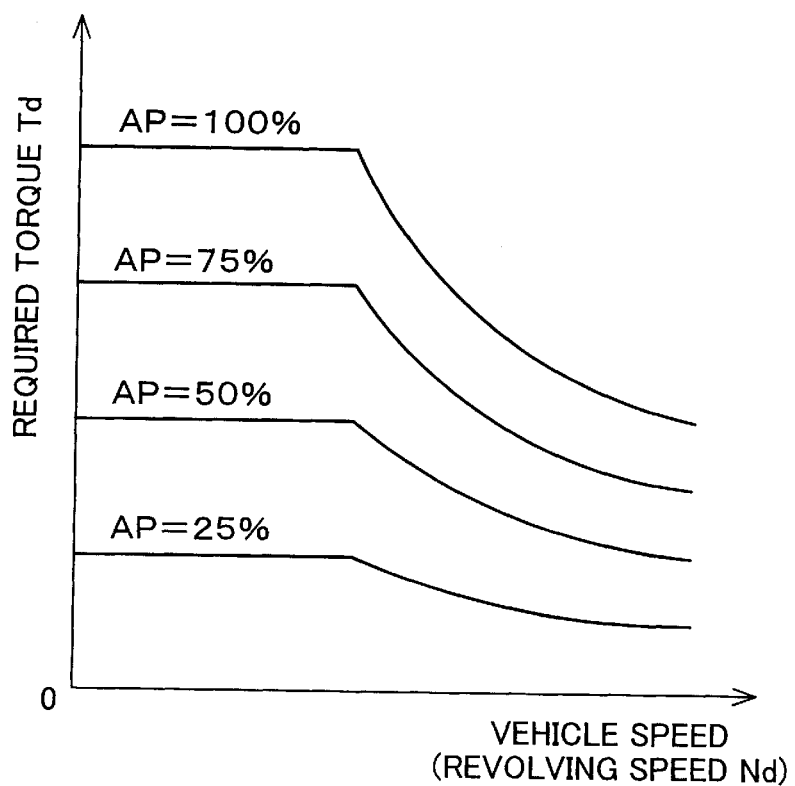
FIG. 19 is a graph showing the required torque Td plotted against the vehicle speed with regard to the depression amount AP of the accelerator pedal as a parameter.

The required torque Td of the axle is read from a vehicle requirement torque map shown in FIG. 19. This map gives the required torque Td of the axle against the vehicle speed with regard to the depression amount AP of the accelerator pedal (or the throttle opening θ) as a parameter. The direct torque is a specific portion of the torque Te of the engine 150 transmitted to the axle and is defined as Te/ρ according to Equation (5) given above.

The process then restricts the required torque Tmr of the motor MG2 thus obtained to an upper limit torque Tmmx. The upper limit torque Tmmx is calculated from the maximum consumed energy Pmmx of the motor MG2 specified by Equation (16) and the revolving speed Nm of the motor MG2 according to Equation (20) given below:

$$Tmmx=(60/2\pi)\times Pmmx/Nm \quad (20)$$

The required torque Tmr of the motor MG2 determined by Equation (19) is compared with the upper limit torque Tmmx specified by Equation (20). The process restricts the required torque Tmr to the upper limit torque Tmmx and specifies the target torque Tm of the motor MG2 as:

$$Tm \leftarrow Tmr(Tmr \leq Tmmx)$$

$$Tm \leftarrow Tmmx(Tmr>Tmmx) \quad (21)$$

Figure 15:
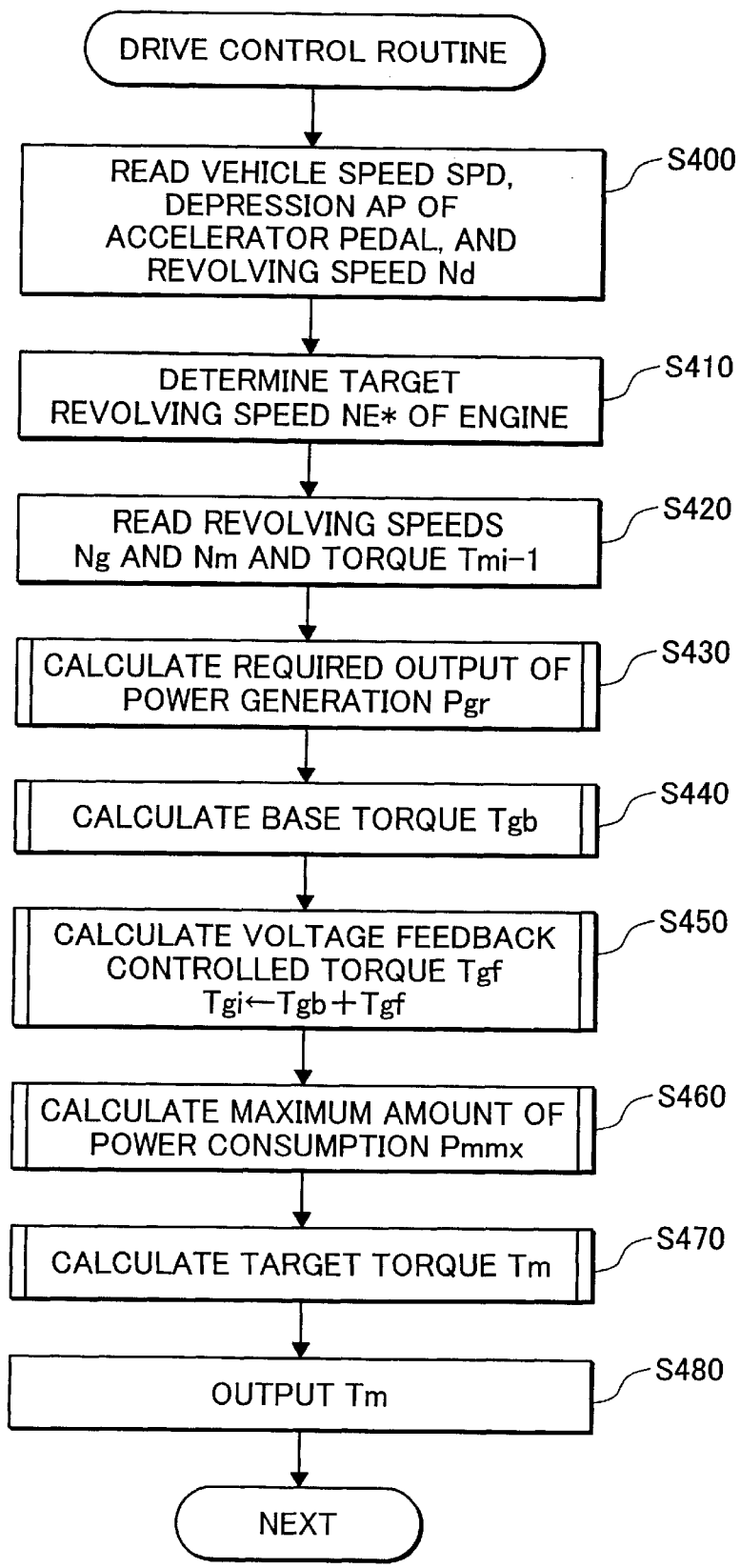
FIG. 15 is a flowchart showing a drive control routine for batter-less drive using inverters.

Referring back to the flowchart of FIG. 15, the procedure outputs the target torque Tm of the motor MG2 thus obtained at step S480. The control routine of FIG. 15 regulates the target torque Tgi of the motor MG1, which functions as the generator, based on the basic torque Tgb and the voltage feedback controlled torque Tgf (step S450), and regulates the target torque Tm of the motor MG2 based on the maximum consumed energy Pmmx of the motor MG2, which is obtained by subtracting the losses from the maximum generated output according to Equation (16) (step S480). The revolving speed Ne of the engine 150 is under the feedback control by the engine ECU 240. This arrangement makes the amount of power generation by the motor MG1 balance with the amount of power consumption by the motor MG2 and thus enables the vehicle to be driven without charging or discharging the HV battery 194. The motor MG1 functioning as the generator is subject to the feedback control with the controlled value Tgf based on the difference ΔV between the observed d.c. voltage of power generation and the target voltage. This feedback control ensures a quick response to the voltage variation and effectively actualizes the battery-less drive, which has not been sufficiently attained by the simple balance of the power generation with the power consumption.

H. Control Procedure in State of Weldinq Failure of System Main Relay

Figure 20:
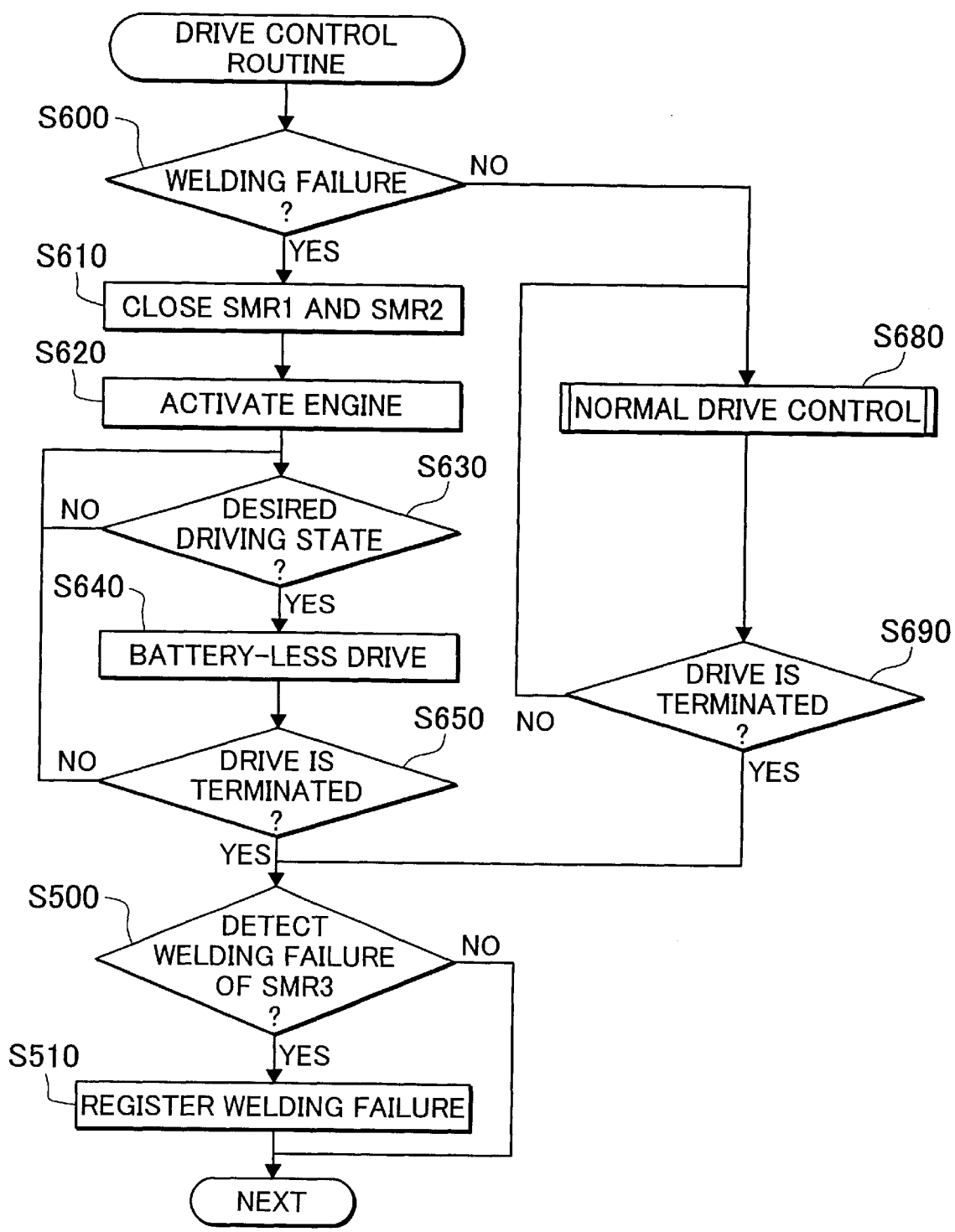
FIG. 20 is a flowchart showing a drive control routine in the state of a welding failure of the system main relay SMR3.

The following describes the control procedure in the state of welding failure of the system main relay SMR as an application of the embodiment. The cause of the welding failure of the system main relays SMR1, SMR2, and SMR3 and the method of detecting the welding failure have been discussed already. FIG. 20 is a flowchart showing a drive control routine executed in the state of welding failure of the system main relay SMR. In the end of this drive control routine, the procedure detects a welding failure of the system main relay SMR3 at the timing specified in FIG. 4B at step S500 and registers the welding failure in the abnormality record registration circuit 280 at step S510. When a next drive of the vehicle starts, the program enters this drive control routine of FIG. 20. The procedure first reads the contents of the abnormality record registration circuit 280 and determines whether or not the system main relay SMR3 has a welding failure at step S600. When there is a welding failure in the system main relay SMR3, the procedure lights the diagnosis lamp 291 on and successively closes the system main relays SMR1 and SMR2 to connect the HV battery 194 with the power lines L1 and L2 at step S610 as in the case of the control procedure in the normal state. When there is no welding failure in the system main relay SMR3, on the other hand, the procedure carries out the drive control in the normal state at step S680.

In the state of the welding failure, after closing the system main relays SMR1 and SMR2, the procedure activates the engine 150 at step S620 as in the case of the control procedure in the normal state. Once the engine 150 is activated, the vehicle can be driven in the battery-less drive mode as discussed in the above embodiment. The procedure accordingly waits until the driving state of the engine 150 satisfies desired conditions at step S630. When the driving state of the engine 150 meets the desired conditions, the procedure opens the system main relays SMR1 and SMR2 to allow a shift to the battery-less drive mode at step S640. In either case, when the drive of the vehicle is terminated (steps S650 and S690), the procedure again detects the welding failure of the system main relays SMR3 and registers the welding failure if detected (steps S500 and S510).

In the application of the embodiment described above, when a welding failure arises in the system main relay SMR3, the control procedure connects the HV battery 194 with the power lines L1 and L2 for a short time period until the engine 150 is activated. Once the engine 150 is activated, the HV battery 194 is disconnected from the power lines L1 and L2, and the vehicle is driven in the battery-less drive mode. In the case where the vehicle is involved in some traffic accident, the vehicle stops to terminate the power generation and lose the voltage on the power lines L1 and L2. This protects the driver, mechanic, or any related people from electric shocks. In the battery-less drive mode, the HV battery 194 is separated from the power lines L1 and L2, so that the high voltage of the HV battery 194 is not applied to the power lines L1 and L2.

I. Structure of Electrical Distribution Type

Figure 21:
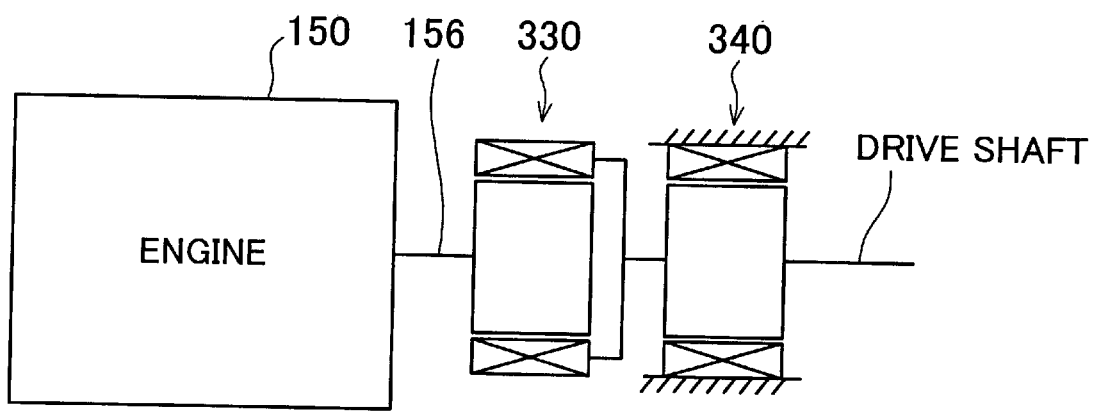
FIG. 21 schematically illustrates the structure of a power output system in an electrical distribution type hybrid vehicle.

The above description regards the mechanical distribution-type parallel hybrid vehicle that distributes the power of the engine 150 by means of the planetary gear 120. The technique of the present invention is also applicable to the electrical distribution type hybrid vehicle that uses a pair-rotor motor including a pair of rotors rotatable relative to each other, in order to actualize a similar battery-less drive. FIG. 21 schematically illustrates the structure of a power output system in the electrical distribution type hybrid vehicle. In this power output system, one rotor of a clutch motor 330, which attains a variable sliding speed between two rotors, is connected to the crankshaft 156 of the engine 150. The other rotor of the clutch motor 330 is connected to the drive shaft. An assist motor 340 is also linked with the drive shaft. In the electrical distribution type power output system, the clutch motor 330 and the assist motor 340 are driven via the inverter circuits as in the structure of the embodiment. The vehicle is driven in the battery-less drive mode as in the case of the above embodiment, in which the on-off control of the inverter circuit connected to the clutch motor 330 is terminated and the power generation utilizing the counter electromotive force is carried out with electric current via the protection diodes disposed in the inverter circuit.

J. Change of Drive Mode

Figure 22:
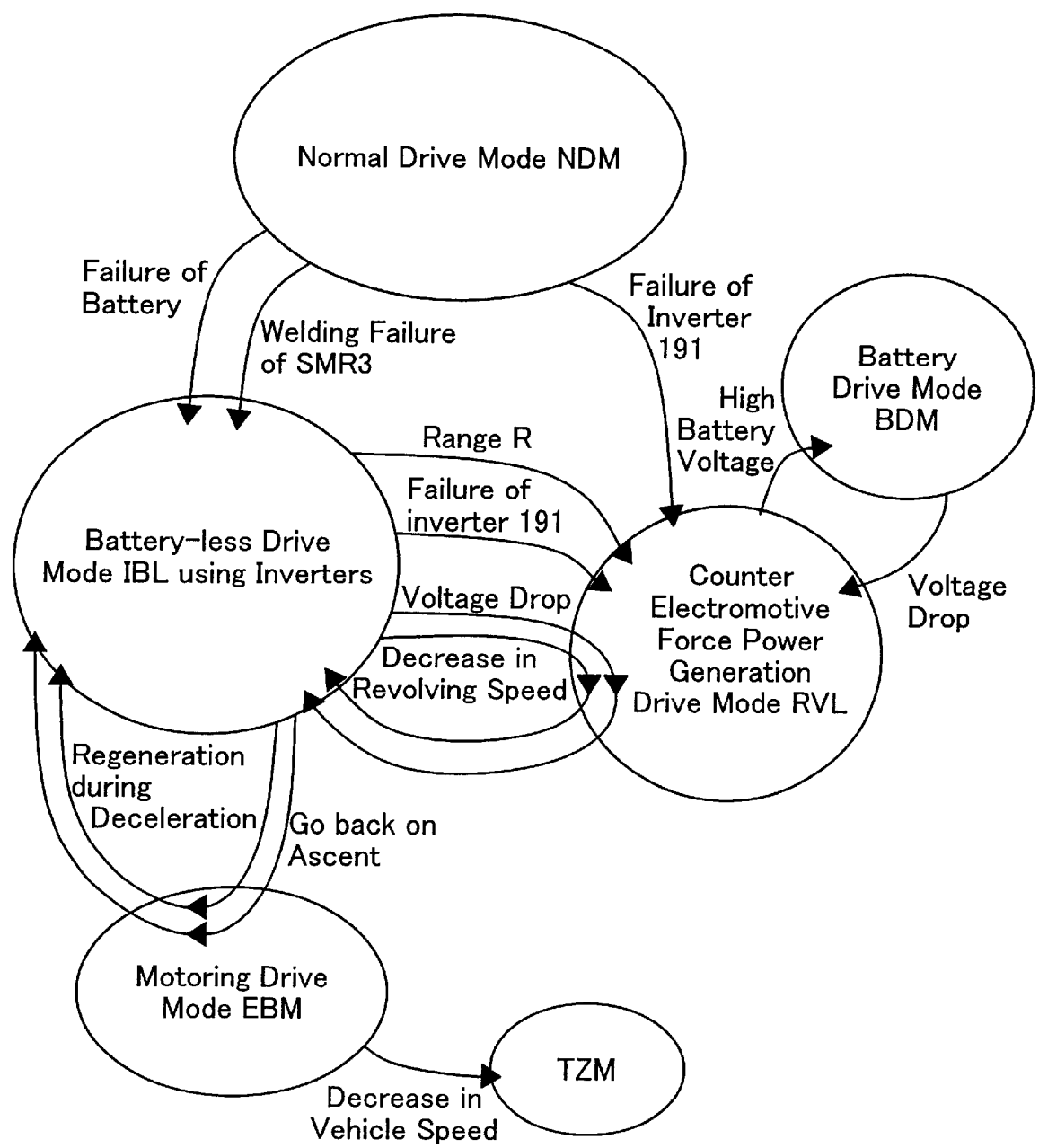
FIG. 22 shows a change of the drive mode in the hybrid vehicle.

The hybrid vehicle may be driven while changing the drive mode. FIG. 22 shows a change of the drive mode. The hybrid vehicle changes the drive mode from a normal drive mode NDM without any failure or abnormality to a battery-less drive mode IBL using the first and the second driving circuits 191 and 192 constructed as the inverters, in response to detection of a failure in the HV battery 194 (on the assumption that the use of the first driving circuit 191 is allowed) or in response to detection of a welding failure in the system main relay SMR3. The battery-less drive mode IBL opens the system main relays SMR1 and SMR2 to disconnect the HV battery 194 from the power line L1. In the case of the welding failure in the system main relay SMR3, the procedure closes the system main relays SMR1 and SMR2 and activates the engine 150, prior to the shift to the battery-less drive mode IBL as described in detail in 'H. Control Procedure in State of Welding Failure of System Main Relay'. The details of the battery-less drive mode IBL using the first and the second driving circuits 191 and 192 functioning as the inverters are described in 'G. Battery-less Drive in Normal State of Inverters' and are thus not specifically described here.

The hybrid vehicle changes the drive mode from the battery-less drive mode IBL to a counter electromotive force power generation drive mode RVL when the first driving circuit 191 fails to prohibit further switching operations, when the vehicle goes back in a range R in the structure of the mechanical distribution type, or when some disturbance lowers the voltage under the control in the battery-less drive mode IBL. The details of the counter electromotive force power generation drive mode RVL are described in 'F. Control Procedure in Response to Detection of Failure'. This drive mode RVL sets the target revolving speed NE* of the engine 150 according to the loading and causes the motor MG1 to carry out power generation utilizing the counter electromotive force. In the case of the reverse drive in the range R in the structure of the mechanical distribution type, the drive mode is shifted to the counter electromotive force power generation drive mode RVL, in order to prevent the direct torque of the engine 150 from being inverse to and thereby canceling the driving torque of the drive shaft. The drop in voltage of power generation occurs in the case where the voltage feedback control fails to recover the voltage level when a delay of the power generation control against a disturbance or another factor abruptly lowers the d.c. voltage or when the significantly low temperature of the engine 150 abruptly lowers its revolving speed. The voltage drop decreases the output torque (see FIG. 17), and the insufficient output torque does not allow recovery of the voltage level. In such cases, the drive mode is shifted to the counter electromotive force power generation drive mode RVL to stop the switching operations of the first driving circuit 191. This raises the inter-terminal voltage of the motor MG1 and causes power generation utilizing the counter electromotive force. When the voltage is recovered to a sufficient level for power generation via the switching operations of the inverters, the drive mode is returned to the battery-less drive mode IBL using the inverters. When there is a failure in the first driving circuit 191, the vehicle directly changes the drive mode from the normal drive mode NDM to the counter electromotive force power generation drive mode RVL.

The hybrid vehicle changes the drive mode from the counter electromotive force power generation drive mode RVL to a battery drive mode BDM when the HV battery 194 has a sufficient high voltage as its state of charge SOC. In the battery drive mode BDM, the first driving circuit 191 is not usable while the use of the second driving circuit 192 is allowed, so that the vehicle is driven as the electric vehicle. At the time of stopping the vehicle driven in this battery drive mode BDM, the motor MG2 carries out the regenerative operation to regenerate the electric current and charges the HV battery 194 via the second driving circuit 192. This recovers the state of charge SOC of the HV battery 194. When the voltage of the HV battery 194 gradually decreases to or below a specific level, at which the HV battery 194 can not actuate the converter 252 (approximately 140 volts in the embodiment), the drive mode is returned to the counter electromotive force power generation drive mode RVL. In the battery drive mode BDM, a braking operation ensures a braking force corresponding to engine brake and besides enables the braking energy to be regenerated as electric power.

When engine brake is required in the course of deceleration or when the vehicle fails to climb a steep ascent and goes back, the vehicle changes the drive mode from the battery-less drive mode IBL using the inverters to a motoring drive mode EBM. In the course of deceleration, the motoring drive mode EBM cuts off the supply of fuel to stop combustion of the fuel in the engine 150 and uses the motor MG2 as the generator to regenerate the braking energy in the form of electric power. The regenerated energy is consumed by the power operation of the motor MG1 to motor the engine 150. When the vehicle goes back unintentionally on a steep ascent, the axle rotates reversely and the motor MG2 functions as the generator. It is thus required to cancel the restriction of the torque, which is calculated from the power of the motor MG1 supposed to function as the generator, to the upper limit torque Tmmx. In such cases, the electric power generated by the motor MG2 is also consumed by the power operation of the motor MG1 to motor the engine 150.

When the vehicle speed is reduced to decrease the consumable energy for motoring and the regenerative electric power becomes greater than the consumed electric power for motoring, the vehicle changes the drive mode from the motoring drive mode EBM to a zero torque drive mode TZM where the target torque Tm of the motor MG2 is set equal to zero. In the zero torque drive mode TZM, the vehicle is subject to no regeneration of electric power nor motoring.

The hybrid vehicle is driven while changing the drive mode in the above manner. Among the various drive modes, the normal drive mode NDM has the greatest output. The battery-less drive mode IBL using the inverters has the greater output than the counter electromotive force power generation drive mode RVL. It is not necessary to adopt all the drive modes shown in FIG. 22. Any combination of required drive modes may be applied according to the design and other requirements of the vehicle. Another possible modification provides a greater number of drive modes and changes the drive mode at a greater number of stages according to the requirements.

The above description regards the application of the present invention, some embodiments according to the present invention, and control procedure of changing the drive mode. The above description is, however, to be considered in all aspects as illustrative and not restrictive. There may be many modifications, changes, and alterations without departing from the scope or spirit of the main characteristics of the present invention. All changes within the meaning and range of equivalency of the claims are therefore intended to be embraced therein.

The scope and spirit of the present invention are indicated by the appended claims, rather than by the foregoing description.

What is claimed is:

1. A hybrid vehicle with an engine, a generator, and a motor mounted thereon, said engine outputting power through combustion of a fuel, said generator provided with permanent magnets generating electric power with at least part of the power output from said engine, said motor outputting power to a drive shaft of said hybrid vehicle, said hybrid vehicle comprising:
   an engine control unit that feedback controls a quantity of the fuel injected to said engine to attain a specified target if revolving speed of said engine;
   a power generation control unit that causes said generator to carry out power generation utilizing a counter electromotive force;
   a loading detection unit that specifies a loading applied to said hybrid vehicle;
   a generator rotational speed variation unit that varies a rotational speed of said generator, based on the specified loading; and
   a motor driving unit that drives said motor with the electric power generated by said generator at the varying rotational speed.

2. A hybrid vehicle in accordance with claim 1, said hybrid vehicle comprising:
   an inverter that switches electric current running through a multiphase coil of said generator;
   a secondary battery that is charged with the direct current converted by the switching operation of said inverter:
   an abnormal state detection unit that detects an abnormal state, which does not allow said secondary battery to be charged via said inverter; and
   an abnormal-state control unit that carries out a specific control, which causes said power generation control unit, said generator rotational speed variation unit, and said motor driving unit to implement their functions, in response to detection of the abnormal state by said abnormal state detection unit.

3. A hybrid vehicle in accordance with claim 2, said hybrid vehicle further comprising:
   an operation unit that prohibits the power generation utilizing the counter electromotive force via said power generation control unit but drives said motor with electric power accumulated in said secondary battery, when an observed voltage level of said secondary battery is higher than the counter electromotive force utilized for the power generation via said power generation control unit.

4. A hybrid vehicle in accordance with claim 1, said hybrid vehicle further comprising:
   a target revolving speed setting unit that specifies the target revolving speed of said engine transmitted to said engine control unit, based on behavior of an accelerator pedal.

5. A hybrid vehicle in accordance with claim 1, wherein said generator rotational speed variation unit increases the rotational speed of said generator with an increase in amount of depression of an accelerator pedal.

6. A hybrid vehicle in accordance with claim 1, wherein said generator rotational speed variation unit lowers or raises the target revolving speed of said engine in response to detection of an increasing tendency or a decreasing tendency of an actual revolving speed of said engine relative to the target revolving speed of said engine transmitted to said engine control unit.

7. A hybrid vehicle in accordance with claim 2, wherein said abnormal state detection unit detects the abnormal state and activates said abnormal-state control unit to carry out the specific control, when an external force makes the drive shaft inversely rotated and said motor fall into a state of power generation.

8. A hybrid vehicle in accordance with claim 1, wherein said motor driving unit comprises:

a maximum electric power setting unit that sets a maximum electric power generated by said generator with the power of said engine;

a driving electric power computation unit that specifies driving electric power consumed for driving said motor within the preset maximum electric power, based on the specified loading;

a power generation unit that causes said generator to generate electric power that is equivalent to the driving electric power consumed by said motor; and a current regulation unit that regulates electric current running through a multiphase coil of said motor with the generated electric power.

9. A method of controlling a hybrid vehicle, wherein an engine outputs power through combustion of a fuel, a generator provided with permanent magnets generate electric power with at least part of the power output from said engine, and a motor is driven with at least part of the electric power generated by said generator, so as to output power to a drive shaft of said vehicle, said method comprising the steps of:

feedback controlling a quantity of the fuel injected to said engine to attain a specified target revolving speed of said engine;

causing said generator to carry out power generation utilizing a counter electromotive force;

specifying a loading applied to said hybrid vehicle;

varying a rotational speed of said generator, based on the specified loading; and driving said motor with the electric power generated by said generator at the varying rotational speed.

* * * * *